US009255434B2

(12) United States Patent
Ozawa

(10) Patent No.: US 9,255,434 B2
(45) Date of Patent: Feb. 9, 2016

(54) VEHICLE POWER WINDOW APPARATUS

(71) Applicant: Koji Ozawa, Aichi (JP)

(72) Inventor: Koji Ozawa, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 14 days.

(21) Appl. No.: 14/481,336

(22) Filed: Sep. 9, 2014

(65) Prior Publication Data

US 2015/0069945 A1 Mar. 12, 2015

(30) Foreign Application Priority Data

Sep. 11, 2013 (JP) ................................ 2013-187880

(51) Int. Cl.

*H02H 7/08* (2006.01)
*E05F 15/16* (2006.01)
*E05F 15/695* (2015.01)

(52) U.S. Cl.

CPC .......... *E05F 15/1684* (2013.01); *E05F 15/695* (2015.01)

(58) Field of Classification Search

USPC ........... 318/75, 400.17, 400.18, 400.27, 786, 318/254.1

See application file for complete search history.

(56) References Cited

U.S. PATENT DOCUMENTS

| | | | | |
|---|---|---|---|---|
| 6,278,250 | B1 * | 8/2001 | Sasaki .................. | E05F 15/695 318/283 |
| 8,073,577 | B2 * | 12/2011 | Kitamura ........... | B60R 16/0231 307/10.1 |
| 8,710,773 | B2 * | 4/2014 | Kigoshi ............. | E05F 15/1684 318/280 |
| 2005/0052082 | A1 * | 3/2005 | Noro .................... | E05F 15/695 307/10.1 |

FOREIGN PATENT DOCUMENTS

| | | | |
|---|---|---|---|
| JP | 06-343279 | A | 12/1994 |
| JP | 2008-019625 | A | 1/2008 |
| JP | 2012-082647 | A | 4/2012 |

* cited by examiner

*Primary Examiner* — Bentsu Ro
*Assistant Examiner* — Iftekhar Mustafa
(74) *Attorney, Agent, or Firm* — Osha Liang LLP

(57) ABSTRACT

A vehicle power window apparatus includes: a driver seat unit and a first non-driver seat switch which is a manual switch provided on a non-driver seat to open and close a non-driver seat window. The driver seat unit includes a switching circuit operated based on a predetermined operation of the first non-driver seat switch. When an extended operation of the first non-driver seat switch set by operating the first non-driver seat switch for a certain time period or more is detected, the control unit drives the switching circuit. After the extended operation of the first non-driver seat switch is released, the control unit fully opens or closes the non-driver seat window in an automatic operation mode by energizing the non-driver seat motor via the switching circuit and the first non-driver seat switch by the power supply.

12 Claims, 16 Drawing Sheets

<WINDOW CLOSING OPERATION> FRONT PASSENGER SEAT SWITCH UP OPERATION

<WINDOW CLOSING OPERATION>
FRONT PASSENGER SEAT SWITCH EXTENDED OPERATION → UPRELAY ON

<WINDOW CLOSING OPERATION>
FRONT PASSENGER SEAT SWITCH UP OPERATION RELEASE → AUTOMATIC UP OPERATION

<WINDOW CLOSING OPERATION>
FRONT PASSENGER SEAT SWITCH DOWN OPERATION
(AUTOMATIC UP OPERATION CANCELLATION)

<WINDOW CLOSING OPERATION> UPRELAY OFF t1
t2
t3 t4
t5 t6 t7

UPSWTICH
21u
ON
OFF

DOWNSWITCH
21d
ON
OFF

UPRELAY
131u
ON
OFF
τ

DOWNRELAY
131d
ON
OFF

P POINT VOLTAGE
Vup
Vdown
0

MOTOR CURRENT
(SHUNT CURRENT)
0
A
B
C
D
E
F

<WINDOW OPENING OPERATION> FRONT PASSENGER SEAT DOWN OPERATION

<WINDOW OPENING OPERATION>

FRONT PASSENGER SEAT EXTENDED OPERATION → DOWNRELAY ON

<WINDOW OPENING OPERATION>
FRONT PASSENGER SEAT DOWN OPERATION RELEASE → AUTOMATIC DOWN OPERATION

<WINDOW OPENING OPERATION>
FRONT PASSENGER SEAT UP OPERATION
(AUTOMATIC DOWN OPERATION CANCELLATION)

<WINDOW OPENING OPERATION> DOWNRELAY OFF t1
t2
t3 t4
t5 t6 t7

UPSWTICH
21u
ON
OFF

DOWNSWITCH
21d
ON
OFF

UPRELAY
131u
ON
OFF

DOWNRELAY
131d
ON
OFF
τ

Vup
P POINT VOLTAGE
Vdown
0

MOTOR CURRENT
(SHUNT CURRENT)
0
A
B
C
D
E
F

VEHICLE POWER WINDOW APPARATUS

BACKGROUND OF THE INVENTION

1. Technical Field

One or more embodiments of the present invention relate to a power window apparatus for opening and closing a vehicle window, particularly, to a power window apparatus in which an occupant in a driver seat can open and close all seat windows including non-driver seat windows by operating respective switches.

2. Related Art

In a power window apparatus in which a vehicle window is caused to be opened and closed by an electric motor, the motor rotates in a clockwise direction or a counter-clockwise direction to open and close the window based on an operation state of an operation switch. For example, when the operation switch is operated to an up position (a window closing position), the motor is driven to rotate in the clockwise direction, and the window is closed. When the operation switch is operated to a down position (a window opening position), the motor is driven to rotate in the counter-clockwise direction, and the window is opened. When a motor drive circuit switches the direction of a current flowing to the motor based on a signal from the operation switch, the motor is controlled to rotate in the clockwise direction or in the counter-clockwise direction.

Typically, a vehicle is provided with respective operation switches for a driver seat and other seats (a front passenger seat, a left rear seat, a right rear seat, and the like). An operation switch of a driver seat includes non-driver seat switches used to remotely open and close non-driver seat windows such as a front passenger seat window in addition to a driver seat switch used to open and close a driver seat window. An operation switch of the non-driver seat is used to open and close only the corresponding non-driver seat window. A control unit is provided so as to control an opening and closing operation of each seat window based on an operation of the corresponding switch.

JP-A-2008-19625 discloses a power window apparatus which is provided with respective control units for the operation switch of the driver seat and the operation switch of each of the non-driver seats, and in which the driver seat control unit and the non-driver seat control units are connected to each other via a serial communication line. In this power window apparatus, when an occupant operates the operation switch of the driver seat so as to open and close the non-driver seat window, the driver seat control unit communicates with the non-driver seat control unit via the serial communication line, and the non-driver seat control unit drives a window opening and closing motor for a non-driver seat.

JP-A-6-343279 discloses the power window apparatus that is provided with a single control unit for the operation switch of the driver seat and the operation switch of each of the non-driver seats. In this power window apparatus, when the single control unit receives an input signal from the operation switch of the driver seat, or the operation switch of the non-driver seat, the single control unit controls a window opening and closing motor for the corresponding seat.

JP-A-2012-82647 discloses the power window apparatus that includes a driver seat unit having the operation switch and the control unit, and a non-driver seat unit having the operation switch and a relay. In addition, the driver seat unit and the non-driver seat unit are connected to each other via a single signal line. In this power window apparatus, contacts of the operation switch and the relay of the non-driver seat unit cause a current flowing to the window opening and closing motor for a non-driver seat to switch its flow direction, based on an opening and closing operation of the non-driver seat window in the driver seat unit.

In the power window apparatus, an opening and closing operation of a window via a switch operation includes a manual operation and an automatic operation. In the manual operation, when a switch is operated to be in a manual opening position, an opening operation of the window is started, and the opening operation continues only while the switch is being operated. When the switch operation is released, the opening operation of the window is stopped. When the switch is operated to be in a manual closing position, a closing operation of the window is started, and the closing operation continues only while the switch is being operated. When the switch operation is released, the closing operation of the window is stopped.

In contrast, in the automatic operation, when the switch is further operated from the manual opening position to an automatic opening position, the opening operation of the window transitions to an automatic opening operation, and even when the switch operation is released, the opening operation of the window continues. When the window reaches a fully open position, the opening operation of the window is stopped. When the switch is further operated from the manual closing position to an automatic closing position, the closing operation of the window transitions to an automatic closing operation, and even when the switch operation is released, the closing operation of the window continues. When the window reaches a fully closed position, the closing operation of the window is stopped.

SUMMARY OF THE INVENTION

In the power window apparatus of the related art, when the operation switch provided on each of the non-driver seats does not have an automatic operation function, but has only a manual operation function, the corresponding non-driver seat window cannot be opened and closed in an automatic operation mode when the operation switch of the corresponding non-driver seat is operated.

In contrast, when the operation switch provided on each of the non-driver seats has the automatic operation function, the corresponding non-driver seat window can be opened and closed in the automatic operation mode when the operation switch of the corresponding non-driver seat is operated. However, an operation position of the switch having the automatic operation function is required to be switchable at multiple stages such as the manual opening position, the manual closing position, the automatic opening position, and the automatic closing position. Accordingly, the configuration of the switch becomes complicated.

An object of one or more embodiments of the present invention is to provide a power window apparatus in which it is possible to simplify the configuration of an operation switch of a non-driver seat, and it is possible to open and close a non-driver seat window in an automatic operation mode when the operation switch of the non-driver seat is operated.

A vehicle power window apparatus according to an embodiment of the present invention includes a driver seat unit that is provided on a driver seat in a vehicle; and a first non-driver seat switch that is provided on a non-driver seat, that is electrically connected to the driver seat unit, and that is used to open and close a non-driver seat window. The driver seat unit includes a driver seat switch that is used to open and close a driver seat window; a second non-driver seat switch that is used to open and close the non-driver seat window, and a control unit that controls a driver seat motor that opens and closes the driver seat window based on an operation of the driver seat switch, and a non-driver seat motor that opens and closes the non-driver seat window based on an operation of the second non-driver seat switch. The driver seat unit includes a switching circuit that is operated based on a predetermined operation of the first non-driver seat switch. The first non-driver seat switch is a manual switch used to open and close the non-driver seat window in a manual operation mode. The first non-driver seat switch includes a first switch that connects a first end of the non-driver seat motor to a power supply or the switching circuit, and a second switch that connects a second end of the non-driver seat motor to the power supply or the switching circuit. The driver seat unit includes a detecting unit that includes at least one of a voltage detection circuit and a current detection circuit. The voltage detection circuit detects a voltage at one of the first end and the second end of the non-driver seat motor. The current detection circuit detects a current flowing through the non-driver seat motor. When an extended operation of the first non-driver seat switch set by operating the first non-driver seat switch for a certain time period or more is detected based on the voltage or the current detected by the detecting unit in a state where the second non-driver seat switch is not operated, the control unit drives the switching circuit. After the extended operation of the first non-driver seat switch is released, the control unit fully opens or closes the non-driver seat window in an automatic operation mode by energizing the non-driver seat motor via the switching circuit and the first non-driver seat switch by the power supply.

In this configuration, when the first non-driver seat switch, which is a manual switch, is operated for a certain time period or more, thereby being set to the extended operation, the switching circuit is driven, and the operation of the first non-driver seat switch transitions to the automatic operation, and the non-driver seat motor is energized via the switching circuit and the first non-driver seat switch. Thereafter, even when the operation of the first non-driver seat switch is released, the non-driver seat motor continuously rotates. Accordingly, it is possible to perform the automatic opening operation or the automatic closing operation by means of the manual switch. It is possible to simplify the configuration of the first non-driver seat switch, and to open and close the non-driver seat window in the automatic operation mode by means of the first non-driver seat switch.

In one or more embodiments of the present invention, the control unit may perform the following controls. After the extended operation of the first non-driver seat switch is released, when the first non-driver seat switch is operated to a window opening position while the non-driver seat window is being closed in an automatic closing operation mode, the control unit may release the automatic closing operation, and may stop the non-driver seat motor. After the extended operation of the first non-driver seat switch is released, when the first non-driver seat switch is operated to be in a window closing position while the non-driver seat window is being opened in an automatic opening operation mode, the control unit may release the automatic opening operation and may stop the non-driver seat motor.

In one or more embodiments of the present invention, the switching circuit may include a first window closing relay and a second window opening relay. When the first non-driver seat switch is operated to be in the window closing position, the first switch may be switched to a power supply side. When the first non-driver seat switch is operated to the window opening position, the second switch may be switched to the power supply side. In a state where the first switch is switched to the power supply side, when the first non-driver seat switch is set to the extended operation, the first relay may be switched to the power supply side. After the extended operation of the first non-driver seat switch is released, a current route may be formed from the power supply to a ground via the first relay, the first switch, the non-driver seat motor, the second switch, and the second relay. In a state where the second switch is switched to the power supply side, when the first non-driver seat switch is set to the extended operation, the second relay may be switched to the power supply side. After the extended operation of the first non-driver seat switch is released, a current route may be formed from the power supply to the ground via the second relay, the second switch, the non-driver seat motor, the first switch, and the first relay.

In one or more embodiments of the present invention, the control unit may determine which one of the first and second switches is switched to the power supply side based on the voltage detected by the voltage detection circuit when the first switch is switched to the power supply side, and based on the voltage detected by the voltage detection circuit when the second switch is switched to the power supply side. When the control unit determines that the first switch is switched to the power supply side, the control unit may switch the first relay to the power supply. When the control unit determines that the second switch is switched to the power supply side, the control unit may switch the second relay to the power supply.

In one or more embodiments of the present invention, the control unit may detect whether the first non-driver seat switch is operated for multiple consecutive times within a predetermined time period, instead of detecting whether the first non-driver seat switch is set to the extended operation by operating the first non-driver seat for a predetermined time period or more.

According to one or more embodiments of the present invention, it is possible to provide the power window apparatus in which it is possible to simplify the configuration of the operation switch of the non-driver seat, and it is possible to open and close the non-driver seat window in the automatic operation mode when the operation switch of the non-driver seat is operated.

BRIEF EXPLANATION OF THE DRAWINGS

FIG. 4 is a diagram illustrating a circuit state when the front passenger seat switch is extensionally operated, and an up relay is turned on;

FIG. 10 is a diagram illustrating a circuit state when the front passenger seat switch is extensionally operated, and a down relay is turned on;

DETAILED EXPLANATION

Figure 1:
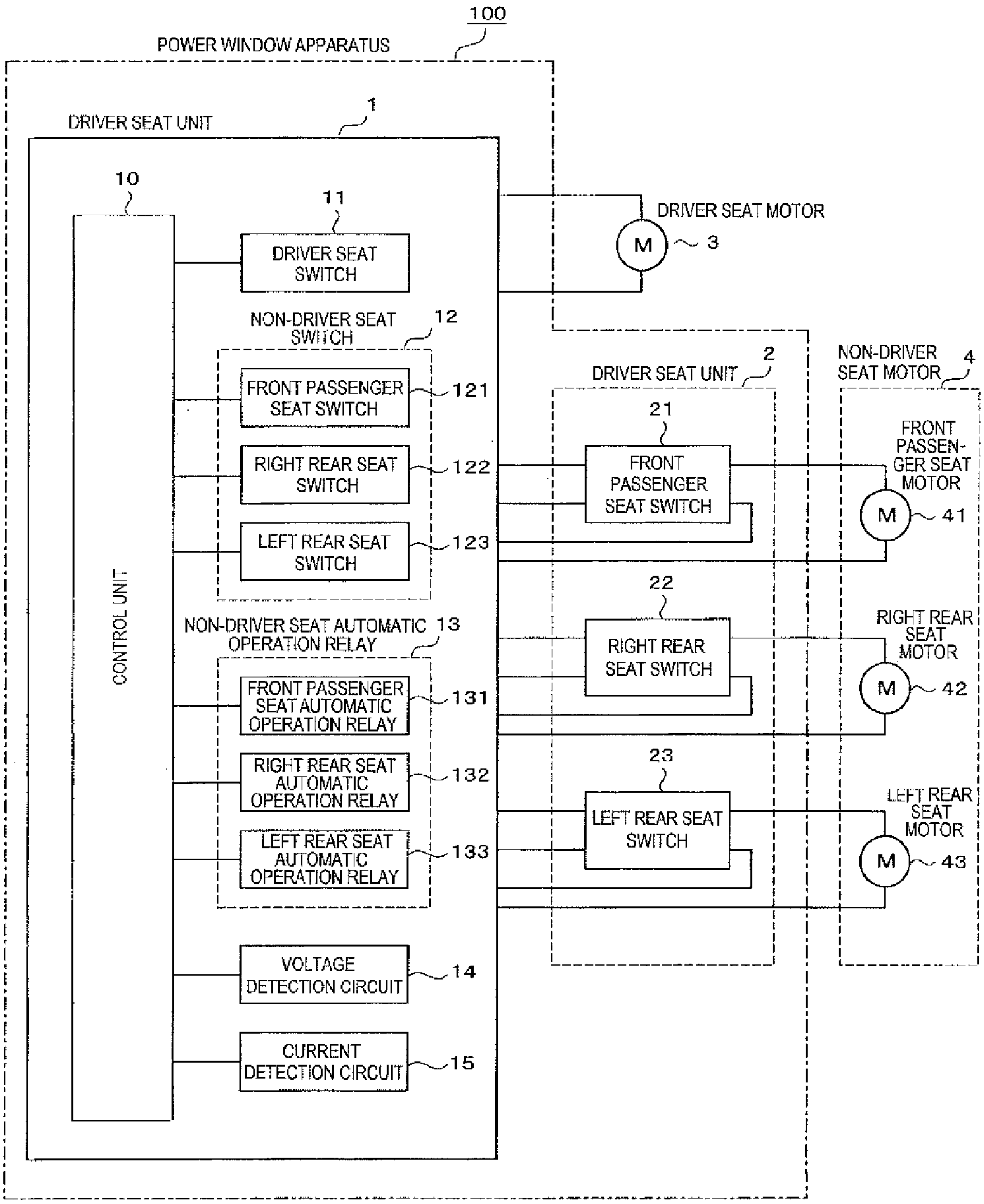
FIG. 1 is a schematic configuration diagram of a vehicle power window apparatus according to an embodiment of the present invention.

Hereinafter, a vehicle power window apparatus (hereinafter, simply referred to as a "power window apparatus") according to an embodiment of the present invention will be described with reference to the accompanying drawings. In the drawings, the same reference numbers are assigned to the same part or the corresponding parts. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First, a schematic configuration of the power window apparatus will be described with reference to FIG. 1. In FIG. 1, a power window apparatus 100 is configured to include a driver seat unit 1 and a non-driver seat switch 2. The power window apparatus 100 controls a driver seat motor 3 to open and close a driver seat window, and controls a non-driver seat motor 4 to open and close non-driver seat windows.

The driver seat unit 1 is provided on the driver seat in the vehicle, and has a control unit 10, a driver seat switch 11, a non-driver seat switch 12, a non-driver seat automatic operation relay 13, a voltage detection circuit 14, and a current detection circuit 15.

The control unit 10 is configured to include a CPU, a memory, and the like, and controls an operation of the power window apparatus 100. The driver seat switch 11 is a switch, the operation of which causes the driver seat motor 3 to open and close the driver seat window.

The non-driver seat switch 12 is a switch, the operation of which causes the non-driver seat motor 4 to open and close each of the non-driver seat windows. The non-driver seat switch 12 is configured to include a front passenger seat switch 121, a right rear seat switch 122, and a left rear seat switch 123. The front passenger seat switch 121 of the driver seat is a switch used to open and close a front passenger seat window. The right rear seat switch 122 of the drive seat is a switch used to open and close a right rear seat window. The left rear seat switch 123 of the driver seat is a switch used to open and close a left rear seat window. Each the driver seat switch 11 and the non-driver seat switch 12 has a manual operation function and an automatic operation function.

When a predetermined operation of the non-driver seat switch 2 is performed, the non-driver seat automatic operation relay 13 operates and switches an opening and closing operation of the non-driver seat window from a manual operation mode to an automatic operation mode. The non-driver seat automatic operation relay 13 is configured to include a front passenger seat automatic operation relay 131, a right rear seat automatic operation relay 132, and a left rear seat automatic operation relay 133. The voltage detection circuit 14 and the current detection circuit 15 will be described later.

The non-driver seat switch 2 is provided on each of the non-driver seats, and is electrically connected to the driver seat unit. The non-driver seat switch 2 is a switch used to open and close the corresponding non-driver seat window when an operation switch of the non-driver seat is operated. The non-driver seat switch 2 is configured to include a front passenger seat switch 21, a right rear seat switch 22, and a left rear seat switch 23.

The front passenger seat switch 21 of the front passenger seat is a switch used to open and close the front passenger seat window. The right rear seat switch 22 of the right rear seat is a switch used to open and close the right rear seat window. The left rear seat switch 23 of the left rear seat is a switch used to open and close the left rear seat window. Each of the non-driver seat switches 21 to 23 is a manual switch used to open and close the corresponding non-driver seat window in the manual operation mode, and is a so-called momentary switch, a contact of which can only be switched while the switch is being operated. None of the non-driver seat switches 21 to 23 has a function of fully opening and closing the corresponding non-driver seat window in an automatic operation mode.

The driver seat motor 3 opens and closes the driver seat window based on an operation of the driver seat switch 11, and is electrically connected to the driver seat unit 1. The non-driver seat motor 4 opens and closes the non-driver seat window based on an operation of the non-driver seat switch 12 provided on the driver seat, or based on an operation of the non-driver seat switch 2 provided on the non-driver seat. The non-driver seat motor 4 is configured to include a front passenger seat motor 41, a right rear seat motor 42, and a left rear seat motor 43.

The front passenger seat motor 41 opens and closes the front passenger seat window, and is electrically connected to the front passenger seat switch 21 and the driver seat unit 1. More specifically, one end of the front passenger seat motor 41 (a lower side of the front passenger seat motor 41 in FIG. 1) is electrically connected to the driver seat unit 1, and then is electrically connected to the front passenger seat switch 21 via the driver seat unit 1. The other end of the front passenger seat motor 41 (an upper side of the front passenger seat motor 41 in FIG. 1) is electrically connected to the front passenger seat switch 21.

The right rear seat motor 42 opens and closes the right rear seat window, and is electrically connected to the right rear seat switch 22 and the driver seat unit 1. More specifically, one end of the right rear seat motor 42 (a lower side of the right rear seat motor 42 in FIG. 1) is electrically connected to the driver seat unit 1, and then is electrically connected to the right rear seat switch 22 via the driver seat unit 1. The other end of the right rear seat motor 42 (an upper side of the right rear seat motor 42 in FIG. 1) is electrically connected to the right rear seat switch 22.

The left rear seat motor 43 opens and closes the left rear seat window, and is electrically connected to the left rear seat switch 23 and the driver seat unit 1. More specifically, one end of the left rear seat motor 43 (a lower side of the left rear seat motor 43 in FIG. 1) is electrically connected to the driver seat unit 1, and then is electrically connected to the left rear seat switch 23 via the driver seat unit 1. The other end of the left rear seat motor 43 (an upper side of the left rear seat motor 43 in FIG. 1) is electrically connected to the left rear seat switch 23.

The voltage detection circuit 14 of the driver seat unit 1 detects a voltage at one end of each the front passenger seat motor 41, the right rear seat motor 42, and the left rear seat motor 43. The current detection circuit 15 of the driver seat unit 1 detects a motor current flowing to each the driver seat motor 3, the front passenger seat motor 41, the right rear seat motor 42, and the left rear seat motor 43.

In the above-mentioned configuration, the non-driver seat switch 2 provided on the non-driver seat is an example of "a first non-driver seat switch" in one or more embodiments of the invention. The non-driver seat switch 12 provided on the driver seat is an example of "a second non-driver seat switch" in one or more embodiments of the invention. The non-driver seat automatic operation relay 13 is an example of "a switching circuit" in one or more embodiments of the invention. The voltage detection circuit 14 and the current detection circuit 15 are examples of "detecting means" in one or more embodiments of the invention.

Figure 2:
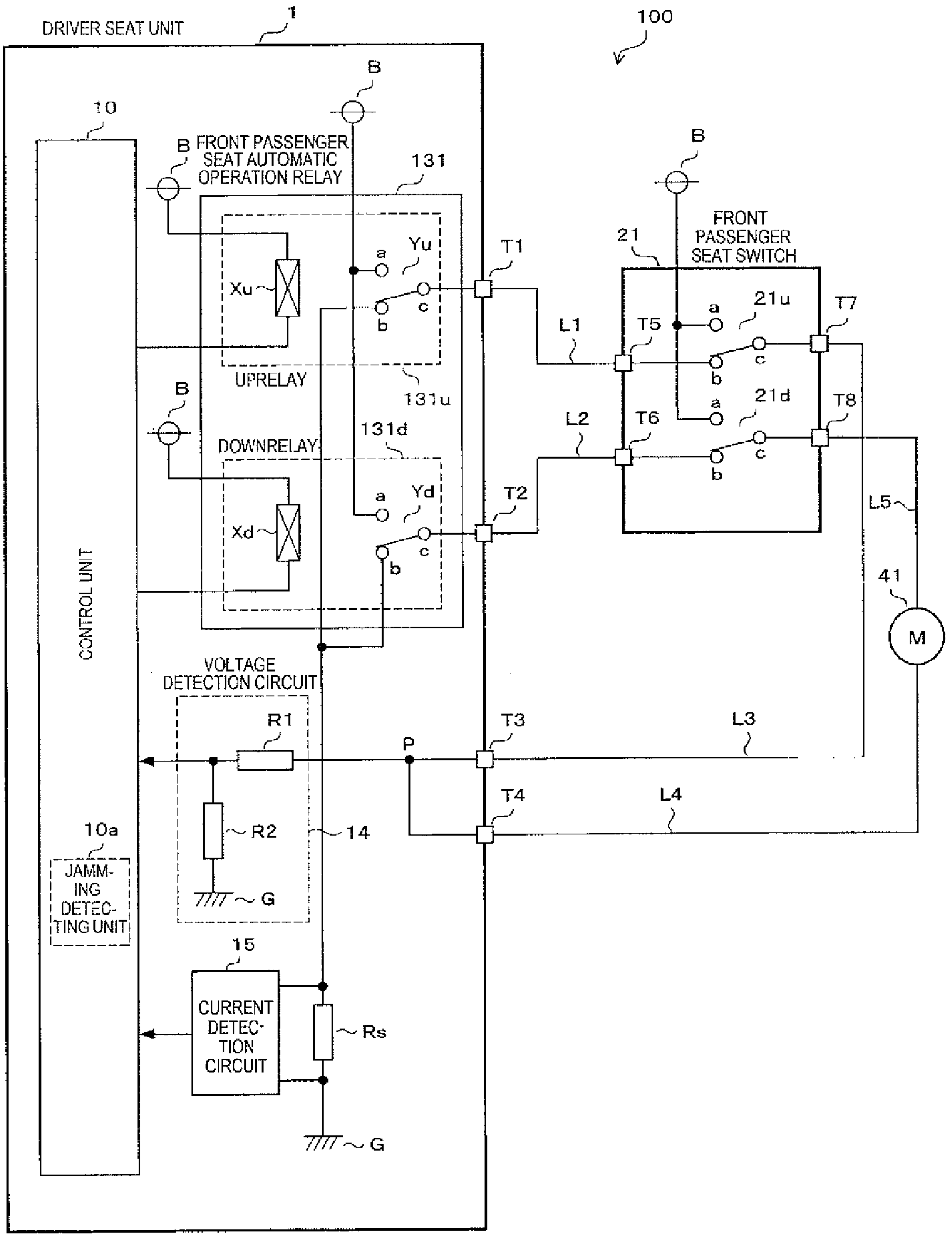
FIG. 2 is a detailed configuration diagram of the power window apparatus.

Subsequently, a specific configuration of the driver seat unit 1 and the non-driver seat switch 2 will be described with reference to FIG. 2. In FIG. 2, the driver seat switch 11 and the non-driver seat switch 12 shown in FIG. 1 are not illustrated in the driver seat unit 1. Only the front passenger seat switch 21 is illustrated as the non-driver seat switch 2 shown in FIG. 1. The right rear seat switch 22 and the left rear seat switch 23 are not illustrated. In contrast, in FIG. 2, only the front passenger seat automatic operation relay 131 is illustrated as the non-driver seat automatic operation relay 13. The right rear seat automatic operation relay 132 and the left rear seat automatic operation relay 133 are not illustrated. Only the front passenger seat motor 41 is illustrated as the non-driver seat motor 4. The right rear seat motor 42 and the left rear seat motor 43 are not illustrated.

The front passenger seat automatic operation relay 131 of the driver seat unit 1 is configured to include two relays 131*u* and 131*d*. The relay 131*u* is a window closing relay that is operated so as to close the front passenger seat window in an automatic closing operation mode. The relay 131*u* includes a coil Xu and a contact Yu. The relay 131*d* is a window opening relay that is operated so as to open the front passenger seat window in an automatic opening operation mode. The relay 131*d* includes a coil Xd and a contact Yd. Hereinafter, the relay 131*u* is referred to as "an up relay", and the relay 131*d* is referred to as "a down relay".

In the up relay 131*u*, one end of the coil Xu is connected to a power supply B, and the other end of the coil Xu is connected to the control unit 10. When the coil Xu is not energized, the contact Yu is switched to a normally closed terminal b (a ground). When the coil Xu is energized, the contact Yu is switched to a normally open terminal a (the power supply). The normally open terminal a is connected to the power supply B, and is connected to the normally open terminal a of the down relay 131*d*. The normally closed terminal b is grounded to a ground G via a shunt resistor Rs which will be described later, and is connected to the normally closed terminal b of the down relay 131*d*. A common terminal c of the contact Yu is connected to a terminal T1 of the driver seat unit 1.

In the down relay 131*d*, one end of the coil Xd is connected to the power supply B, and the other end of the coil Xd is connected to the control unit 10. When the coil Xd is not energized, the contact Yd is switched to the normally closed terminal b (the ground). When the coil Xd is energized, the contact Yd is switched to the normally open terminal a (the power supply). The normally open terminal a is connected to the power supply B, and is connected to the normally open terminal a of the up relay 131*u*. The normally closed terminal b is grounded to the ground G via the shunt resistor Rs which will be described later, and is connected to the normally closed terminal b of the up relay 131*u*. The common terminal c of the contact Yd is connected to a terminal T2 of the driver seat unit 1.

The front passenger seat switch 21 is configured to include two switches 21*u* and 21*d*. The switch 21*u* is a window closing switch that is operated so as to close the front passenger seat window. The switch 21*d* is a window opening switch that is operated so as to open the front passenger seat window. The front passenger seat switch 21 is a manual switch used to open and close the front passenger seat window in the manual operation mode. The front passenger seat switch 21 is a so-called momentary switch, a contact of which can only be switched while the switches 21*u* and 21*d* are being operated. The front passenger seat switch 21 does not have a function of fully opening or closing the front passenger seat window in the automatic operation mode. Hereinafter, the switch 21*u* is referred to as "an up switch", and the switch 21*d* is referred to as "a down switch".

The up switch 21*u* is switched to either the normally open terminal a (the power supply) or the normally closed terminal b (the ground). The normally open terminal a is connected to the power supply B, and is connected to the normally open terminal a of the down switch 21*d*. The normally closed terminal b is connected to a terminal T5 of the front passenger seat switch 21, and the common terminal c is connected to a terminal T7 of the front passenger seat switch 21. The terminal T5 is connected to the terminal T1 of the driver seat unit 1 via a wiring L1. Accordingly, the normally closed terminal b of the up switch 21*u* is grounded to the ground G via the terminal T5, the wiring L1, the terminal T1, the normally closed terminal b of the up relay 131*u*, and the shunt resistor Rs.

The down switch 21*d* is also switched to either the normally open terminal a (the power supply) or the normally closed terminal b (the ground). The normally open terminal a is connected to the power supply B, and is connected to the normally open terminal a of the up switch 21*u*. The normally closed terminal b is connected to a terminal T6 of the front passenger seat switch 21, and the common terminal c is connected to a terminal T8 of the front passenger seat switch 21. The terminal T6 is connected to the terminal T2 of the driver seat unit 1 via a wiring L2. Accordingly, the normally closed terminal b of the down switch 21*d* is grounded to the ground G via the terminal T6, the wiring L2, the terminal T2, the normally closed terminal b of the down relay 131*d*, and the shunt resistor Rs.

The terminal T7 of the front passenger seat switch 21 is connected to the terminal T3 of the driver seat unit 1 via a wiring L3. The front passenger seat motor 41 is provided between the terminal T8 of the front passenger seat switch 21 and the terminal T4 of the driver seat unit 1. One end of the front passenger seat motor 41 is connected to the terminal T4 of the driver seat unit 1 via a wiring L4. The other end of the front passenger seat motor 41 is connected to the terminal T8 of the front passenger seat switch 21 via a wiring L5.

In the driver seat unit 1, the terminal T3 is connected to the voltage detection circuit 14, and is connected to the terminal T4. Accordingly, one end of the front passenger seat motor 41 is connected to the voltage detection circuit 14 via the wiring L4 and the terminal T4.

The voltage detection circuit 14 is provided between the terminals T3 and T4, and the control unit 10. The voltage detection circuit 14 is configured to include resistors R1 and R2. One end of the resistor R1 is connected to one end of the resistor R2, and is connected to the control unit 10. The other end of the resistor R1 is connected to the terminals T3 and T4, and the other end of the resistor R2 is grounded to the ground G.

The shunt resistor Rs detects a motor current flowing to the front passenger seat motor 41. One end of the shunt resistor Rs is connected to the normally closed terminal b of each the up relay 131*u* and the down relay 131*d*. The other end of the shunt resistor Rs is grounded to the ground G. Both inputs of the current detection circuit 15 are respectively connected to both ends of the shunt resistor Rs. An output of the current detection circuit 15 is connected to the control unit 10. The control unit 10 includes a jamming detecting unit 10*a* that detects whether foreign debris is jammed in a window based on an output from the current detection circuit 15.

In the above-mentioned configuration, the up switch 21*u* is an example of "a first switch" in one or more embodiments of the invention. The down switch 21*d* is an example of "a second switch" in one or more embodiments of the invention. The up relay 131*u* is an example of "a first relay" in one or more embodiments of the invention. The down relay 131*d* is an example of "a second relay" in one or more embodiments of the invention.

Subsequently, an operation of the power window apparatus 100 will be described. The following operations are the same as those of the related art, respectively: an operation of opening and closing the driver seat window via an operation of the driver seat switch 11 of the driver seat unit 1, and an operation of opening and closing the non-driver seat window via an operation of the non-driver seat switch 12 of the driver seat unit 1.

Here, when the front passenger seat switch 21 as a representative switch of the non-driver seat switch 2 is operated, an operation of the power window apparatus 100 will be described. Hereinafter, an operation of closing a window (a window closing operation) via an operation of the front passenger seat switch 21 to a window closing position is referred to as "an up operation". An operation of opening a window (a window opening operation) via an operation of the front passenger seat switch 21 to a window opening position is referred to as "a down operation". An operation of closing a window (a manual closing operation) in the manual operation mode is referred to as "a manual up operation". An operation of opening a window (a manual opening operation) in the manual operation mode is referred to as "a manual down operation". An operation of closing a window (an automatic closing operation) in the automatic operation mode is referred to as "an automatic up operation". An operation of opening a window (an automatic opening operation in the automatic operation mode is referred to as "an automatic down operation".

1. Normal State

When neither the front passenger seat switch 121 of the driver seat unit 1 nor the front passenger seat switch 21 of the non-driver seat switch 2 is operated, the power window apparatus 100 is in a state illustrated in FIG. 2. In this state, a current route is not formed from the power supply B to the front passenger seat motor 41, and thus the front passenger seat motor 41 is not energized and is stopped.

2. When Window is Closed

Manual Up Operation

Figure 3:
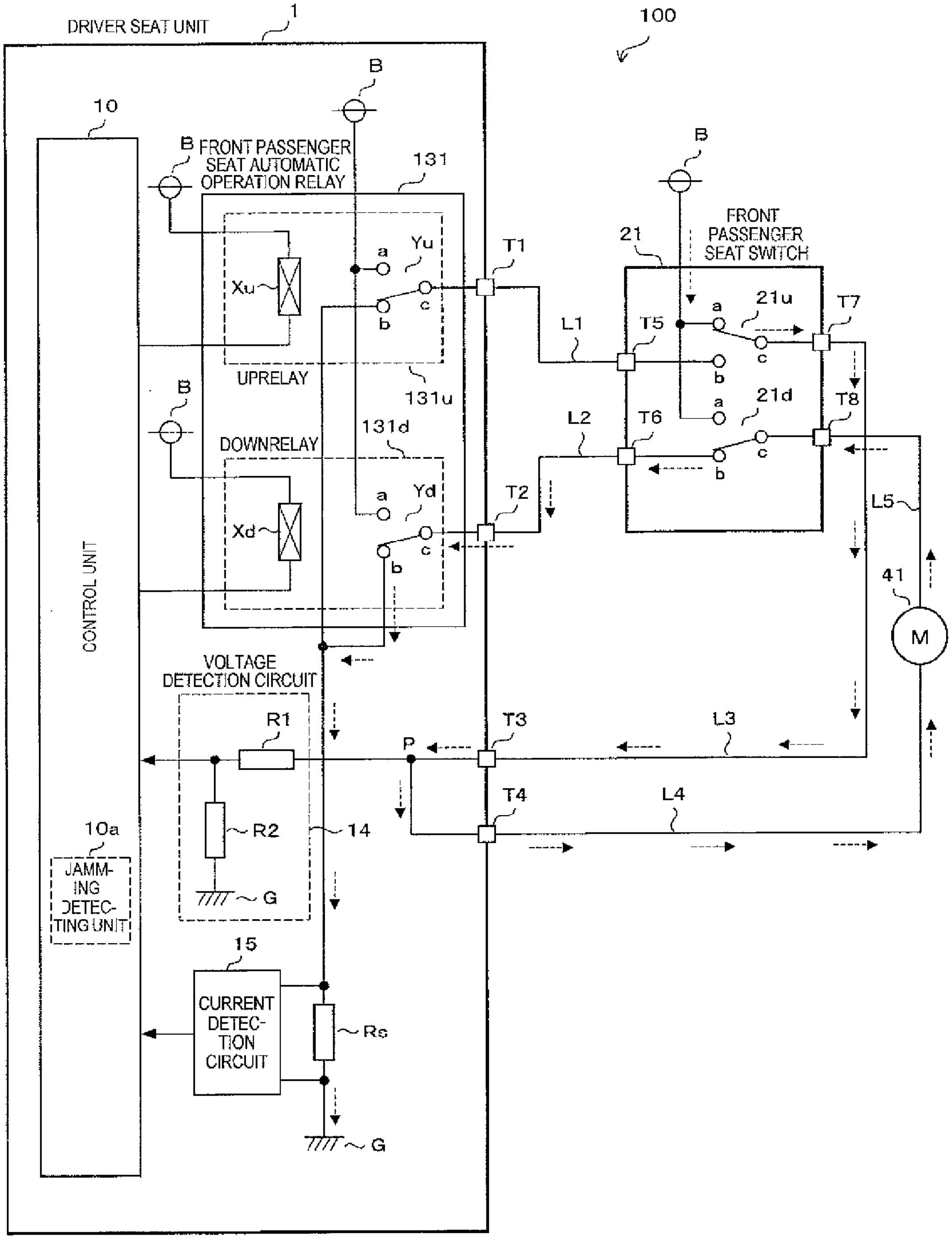
FIG. 3 is a diagram illustrating a circuit state when a front passenger seat switch is set to an up operation (a window closing operation)

FIG. 3 illustrates a current route when the front passenger seat switch 121 of the driver seat unit 1 is not operated, and the front passenger seat switch 21 of the non-driver seat switch 2 is set to the up operation. When the front passenger seat switch 21 is set to the up operation, the window closing up switch 21*u* is switched to the normally open terminal a. As illustrated by the dotted line arrow, the following current route is formed as: the power supply B→the up switch 21*u*→the terminal T7→the wiring L3→the terminal T3→the terminal T4→the wiring L4→the front passenger seat motor 41→the wiring L5→the terminal T8→the down switch 21*d*→the terminal T6→the wiring L2→the terminal T2→the contact Yd of the down relay 131*d*→the shunt resistor Rs→the ground G.

For this reason, a current flows so as to cause the front passenger seat motor 41 to rotate in the clockwise direction. As a result, the front passenger seat motor 41 rotates in the clockwise direction, and the window becomes closed in association with the clockwise rotation. When the up operation is released before a certain time period elapses, the up switch 21*u* switches back to the normally closed terminal b, the power window apparatus 100 returns to the state illustrated in FIG. 2, and the front passenger seat motor 41 is stopped. Accordingly, the manual up operation is performed. In other words, the window can only be closed while the front passenger seat switch 21 is being set to the up operation.

Automatic Up Operation

Figure 4:
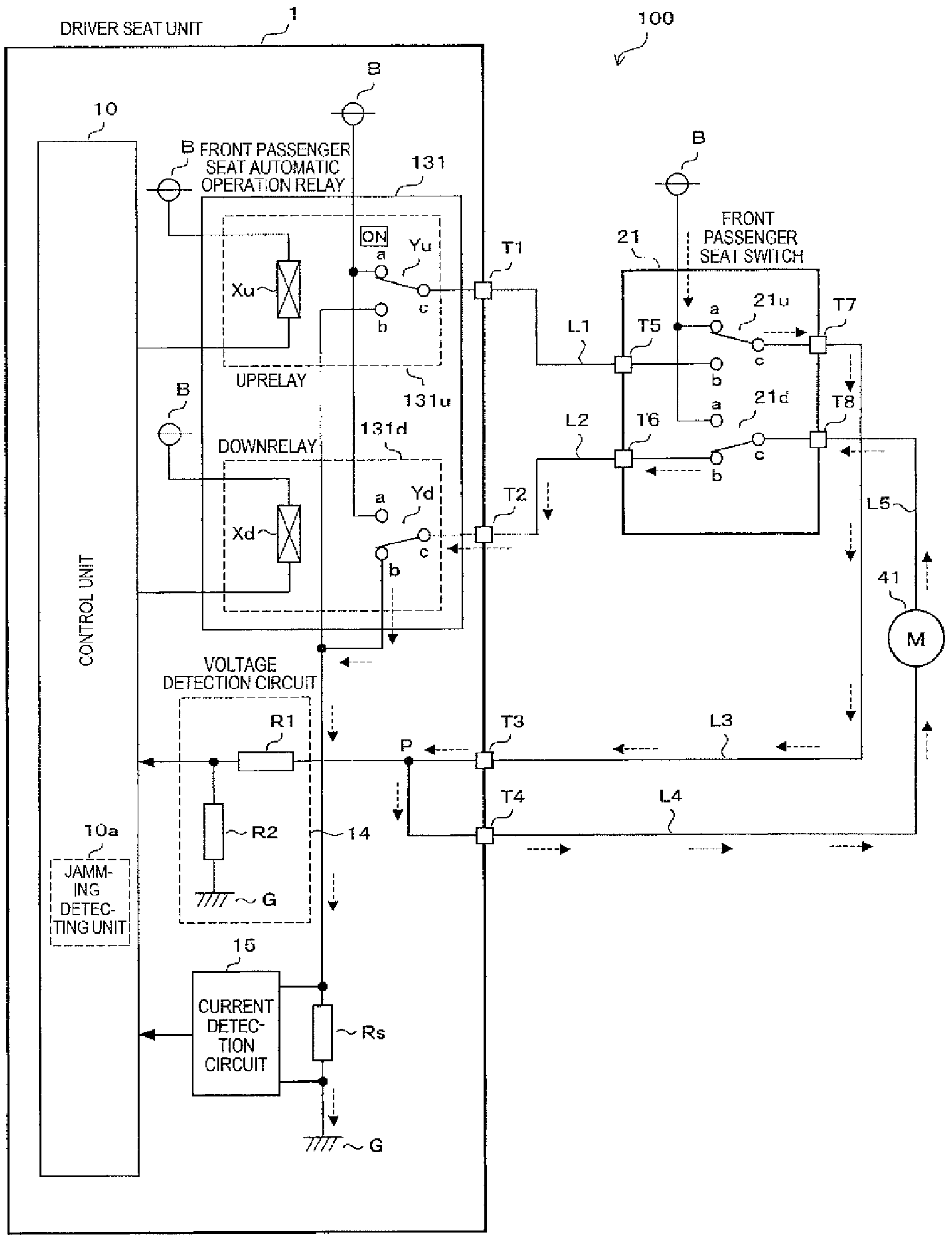

FIG. 4 illustrates a current route when the setting of the front passenger seat switch 21 to the up operation continues from the state illustrated in FIG. 3 for more than a certain time period. When the up switch 21*u* is switched to the normally open terminal a, and a current flows to the front passenger seat motor 41 via the path illustrated in FIG. 3, the voltage detection circuit 14 detects a voltage Vup (a P point voltage) at one end of the front passenger seat motor 41. At this time, the P point voltage becomes approximately equal to a voltage (hereinafter, referred to as "the power supply voltage B") of the power supply B. That is, the voltage Vup becomes approximately equal to the power supply voltage B. The voltage Vup is divided by the resistors R1 and R2 of the voltage detection circuit 14, and the divided voltage Vup*R2/(R1+R2) is input to the control unit 10. The control unit 10 monitors a time period for which the divided voltage is continuously input thereto. Accordingly, the control unit 10 can determine whether the front passenger seat switch 21 is set to the up operation for more than a certain time period, and then is set to an extended operation (a so-called long switch press). When the voltage Vup is approximately equal to the power supply voltage B, the control unit 10 determines that the extended operation of the front passenger seat switch 21 is the up operation, that is, that the up switch 21*u* is switched to the normally open terminal a.

When the control unit 10 determines that the front passenger seat switch 21 is set to the extended up operation, the control unit 10 energizes the coil Xu of the up relay 131*u* of the front passenger seat automatic operation relay 131. Accordingly, the up relay 131*u* is turned on, and as illustrated in FIG. 4, the contact Yu of the up relay 131*u* is switched to the normally open terminal a. At this point, the current route illustrated in FIG. 3 (also illustrated in FIG. 4) is maintained, and the front passenger seat motor 41 continuously rotates in the clockwise direction, and thus the window closing operation continues.

Figure 5:
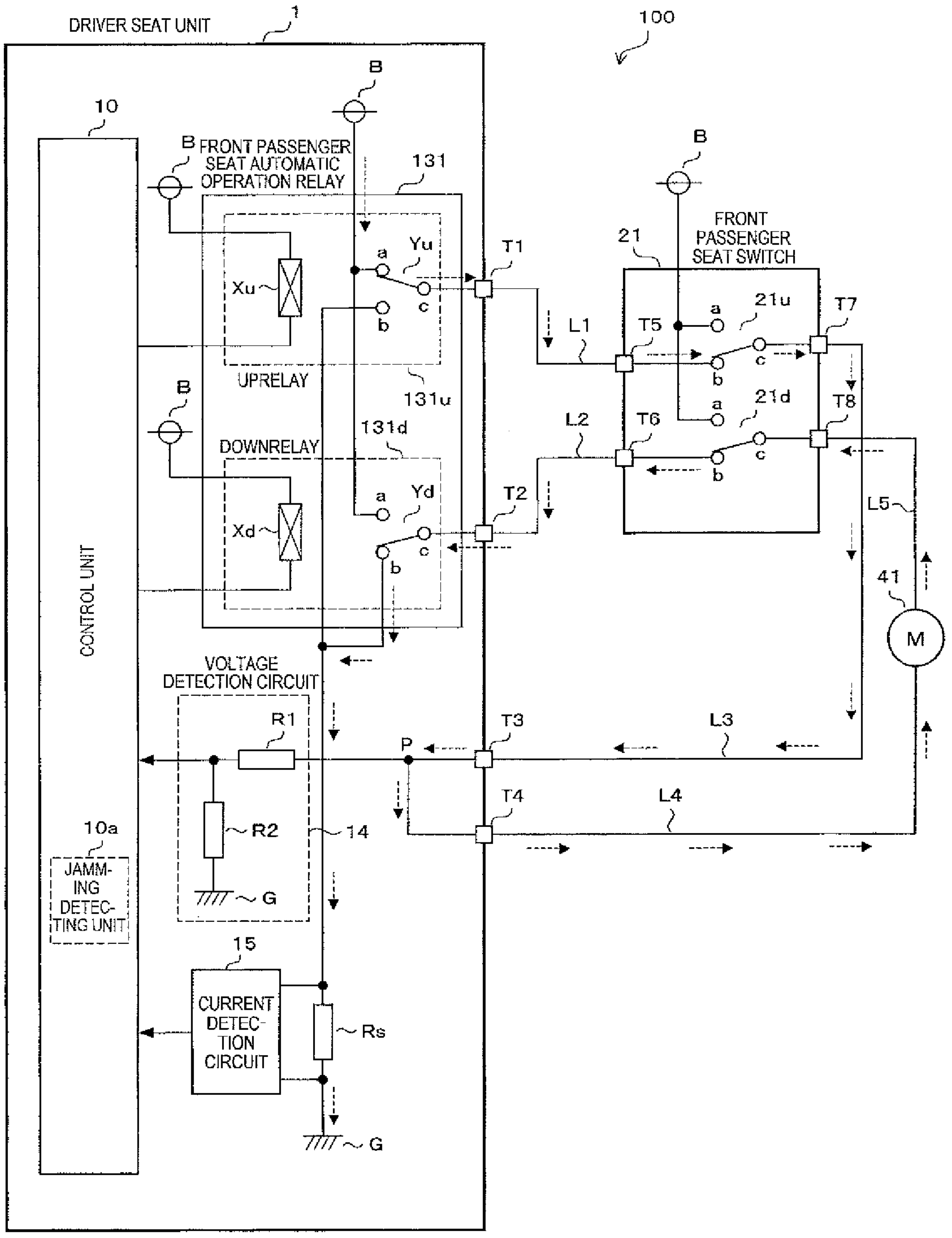
FIG. 5 is a diagram illustrating a circuit state when the up operation of the front passenger seat switch is released, and the operation transitions to an automatic closing operation.

Thereafter, when the extended operation (the up operation) of the front passenger seat switch 21 is released, as illustrated in FIG. 5, the up switch 21*u* is switched to the normally closed terminal b. As illustrated by the dotted line arrow, the following current route is formed as: the power supply B→the contact Yu of the up relay 131*u*→the terminal T1→the wiring L1→the terminal T5→the up switch 21*u*→the terminal T7→the wiring L3→the terminal T3→the terminal T4→the wiring L4→the front passenger seat motor 41→the wiring L5→the terminal T8→the down switch 21*d*→the terminal T6→the wiring L2→the terminal T2→the contact Yd of the down relay→the shunt resistor Rs→the ground G.

For this reason, a current flows so as to cause the front passenger seat motor 41 to rotate in the clockwise direction. As a result, the front passenger seat motor 41 continuously rotates in the clockwise direction, and the window becomes closed in association with the clockwise rotation. When the control unit 10 detects that the window reaches a fully closed state, the control unit 10 stops the energization of the coil Xu of the up relay 131*u*. Accordingly, the up relay 131*u* is turned off, and the contact Yu of the up relay 131*u* is switched to the normally closed terminal b. As a result, a current does not flow to the front passenger seat motor 41, and the front passenger seat motor 41 is stopped.

For example, the fully closed window can be detected based on a motor current flowing through the shunt resistor Rs. Specifically, when the window reaches the fully closed state, a large load is exerted on the front passenger seat motor 41, a motor current increases, and the increasing motor current flows through the shunt resistor Rs, thereby increasing a voltage drop at the shunt resistor Rs. The current detection circuit 15 detects the motor current flowing through the shunt resistor Rs based on the voltage drop, and outputs the detected result to the control unit 10. The control unit 10 compares the motor current with a predetermined threshold value, and when the motor current exceeds the threshold value, the control unit 10 determines that the window is in the fully closed state.

As such, when the up operation of the front passenger seat switch 21 continues for more than a certain time period, the up relay 131*u* is turned on, and the front passenger seat motor 41 is continuously energized via the contact Yu of the up relay 131*u*. Accordingly, the automatic up operation is performed. In other words, even when the up operation of the front passenger seat switch 21 is released, the front passenger seat window is automatically operated to be in the fully closed state.

Figure 6:
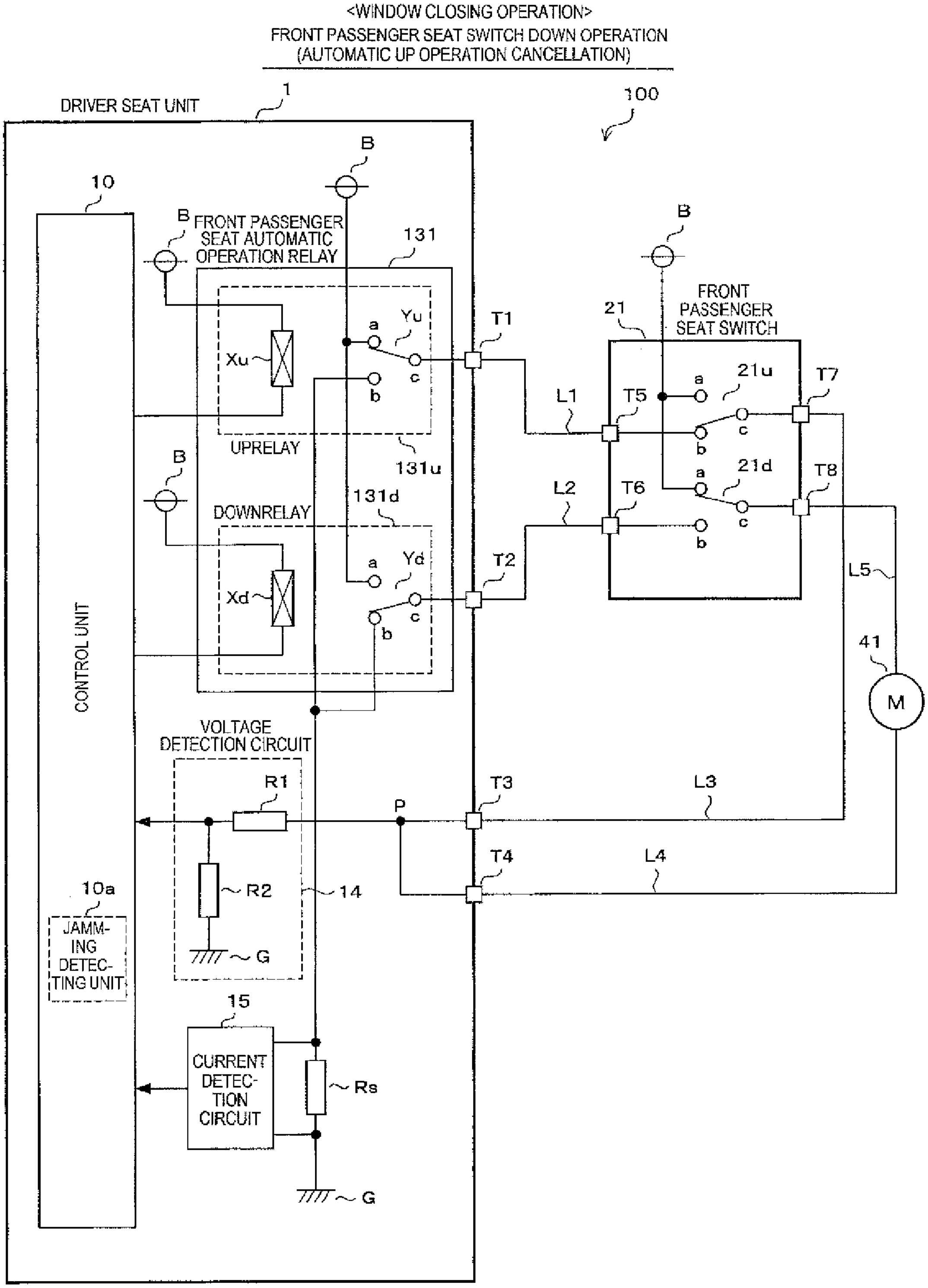
FIG. 6 is a diagram illustrating a circuit state when the front passenger seat switch is set to a down operation (a window opening operation), and the automatic closing operation is released.

When the occupant wants to cancel the ongoing automatic up operation, and stop the front passenger seat motor 41, the occupant sets the front passenger seat switch 21 to the down operation. As illustrated in FIG. 6, the down operation causes the down switch 21*d* of the front passenger seat switch 21 to be switched to the normally open terminal a. One end of the front passenger seat motor 41 is connected to the power supply B via the wiring L4, the wiring L3, the up switch 21*u*, the wiring L1, and the contact Yu of the up relay 131*u*. The other end of the front passenger seat motor 41 is connected to the power supply B via the wiring L5 and the down switch 21*d*. As a result, both ends of the front passenger seat motor 41 have the same electric potential, and thus a current does not flow to the front passenger seat motor 41, and the front passenger seat motor 41 is stopped. The window closing operation is stopped.

Figure 7:
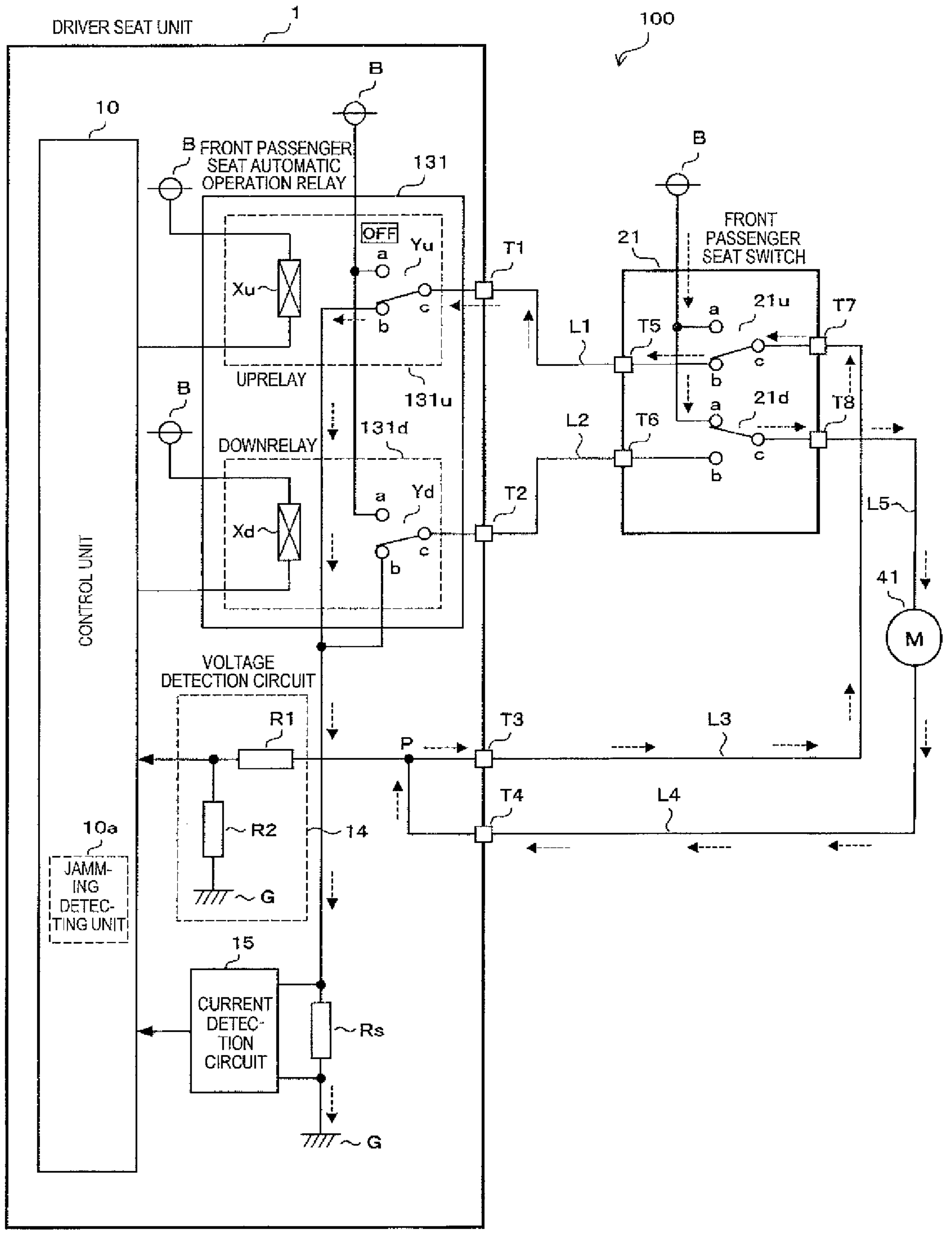
FIG. 7 is a diagram illustrating a circuit state when the up relay is turned off.

When a current does not flow to the front passenger seat motor 41, the current detection circuit 15 cannot detect a motor current, and there is no output from the current detection circuit 15 to the control unit 10. Accordingly, the control unit 10 determines that the automatic up operation is released, and stops the energization of the coil Xu of the up relay 131*u*. As a result, as illustrated in FIG. 7, the up relay 131*u* is turned off, and the contact Yu is switched to the normally closed terminal b. Accordingly, the power window apparatus 100 enters the same state as that when the front passenger seat switch 21 is set to the down operation so as to open the window (a case illustrated in FIG. 9 which will be described later). As a result, before the down operation of the front passenger seat switch 21 is released, a current flows so as to cause the front passenger seat motor 41 to rotate in the counter-clockwise direction, and the window is opened.

As such, when the front passenger seat switch 21 is operated to a down position opposite to an up position in the middle of the automatic up operation, the automatic up operation is released. Accordingly, it is possible to stop the window closing operation.

Figures 8A, 8B, 8C, 8D, 8E, 8F:
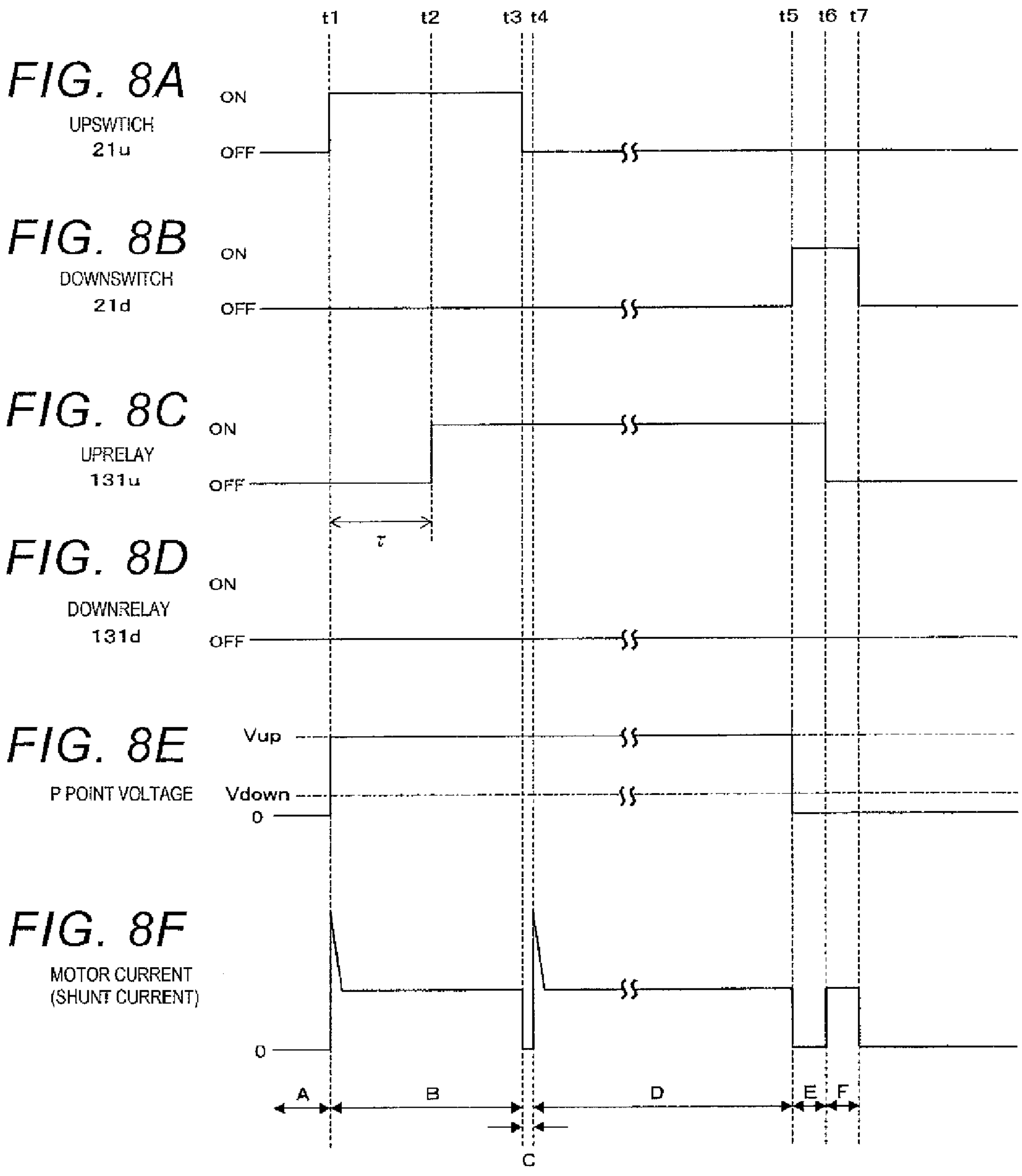
FIGS. 8A to 8F show timing charts for the operations illustrated in FIGS. 3 to 7.

FIGS. 8A to 8F illustrate timing charts for the window closing operations described above. FIG. 8A illustrates the operation of the up switch 21*u*, and FIG. 8B illustrates the operation of the down switch 21*d*. FIG. 8C illustrates the operation of the up relay 131*u*, and FIG. 8D illustrates the operation of the down relay 131*d*. FIG. 8E illustrates the P point voltage (a voltage at one end of the front passenger seat motor 41). The Vup is a voltage level at which a switch operation is determined to be the up operation, and the Vdown is a voltage level at which a switch operation is determined to be the down operation. FIG. 8F illustrates a waveform of a motor current (shunt current) of the front passenger seat motor 41, which flows through the shunt resistor Rs. Each of t1 to t7 indicates time.

The state illustrated in FIG. 2A is shown in a range A of up to the time t1. In this state, a motor current does not flow to the front passenger seat motor 41.

The states illustrated in FIGS. 3 and 4 are shown in a range B of the time t1 to t3. At the time t1, the front passenger seat switch 21 is set to the up operation, and as illustrated in FIG. 8A, the up switch 21*u* is turned on, and is switched to the normally open terminal a. For this reason, the current route is formed as illustrated in FIG. 3, and as illustrated in FIG. 8F, a motor current flows to the front passenger seat motor 41. A steeply rising motor current at the time t1 indicates an inrush current. When a motor current flows to the front passenger seat motor 41, the P point voltage becomes the voltage Vup as illustrated in FIG. 8E.

When the front passenger seat switch 21 is set to the up operation, and then is continuously set to the up operation even after a certain time period τ elapses, as illustrated in FIG. 8C, the up relay 131*u* is turned on at the time t2, and the contact Yu is switched to the normally open terminal a (refer to FIG. 4). Thereafter, when the up operation of the front passenger seat switch 21 is released at the time t3, as illustrated in FIG. 8A, the up switch 21*u* is turned off, and is switched to the normally closed terminal b. It takes a certain time period for the up switch 21*u* to be switched from the normally open terminal a to the normally closed terminal b. For this reason, as illustrated in FIG. 8F, a current does not flow to the front passenger seat motor 41 during a range C of the time t3 to t4. However, since the range C is a very short time period, inertia causes the front passenger seat motor 41 to continuously rotate during the range C. When the up switch 21*u* comes into contact with the normally closed terminal b at the time t4, as illustrated in FIG. 8F, a current flows again to the front passenger seat motor 41. A steeply rising motor current at the time t4 indicates an inrush current.

The state illustrated in FIG. 5 is shown in a range D of the time t4 to t5. In this state, the front passenger seat motor 41 is continuously energized via the contact Yu of the up relay 131*u*. Accordingly, even when the up operation of the front passenger seat switch 21 is released, the front passenger seat window is closed in the automatic up operation mode.

The state illustrated in FIG. 6 is shown in a range E of the time t5 to t6. When the front passenger seat switch 21 is set to the down operation at the time t5, as illustrated in FIG. 8B, the down switch 21*d* is turned on, and is switched to the normally open terminal a. For this reason, both ends of the front passenger seat motor 41 have the same electric potential, and as illustrated in FIG. 8F, a current does not flow to the front passenger seat motor 41. Accordingly, as illustrated in FIG. 8E, the P point voltage becomes 0. The automatic up operation is released, and the front passenger seat switch 21 is stopped.

The state illustrated in FIG. 7 is shown in a range F of the time t6 to t7. As illustrated in FIG. 8C, the up relay 131*u* is turned off at the time t6, and the contact Yu is switched to the normally closed terminal b (refer to FIG. 7). At this time, as described above, a current flows so as to cause the front passenger seat motor 41 to rotate in the counter-clockwise direction, and the window is opened. Thereafter, when the down operation of the front passenger seat switch 21 is released at the time t7, as illustrated in FIG. 8B, the down switch 21*d* is turned off, and is switched to the normally closed terminal b. Accordingly, a current does not flow to the front passenger seat motor 41, and the window opening operation is stopped. The circuit returns to the state illustrated in FIG. 2.

3. When Window is Opened

Manual Down Operation

Figure 9:
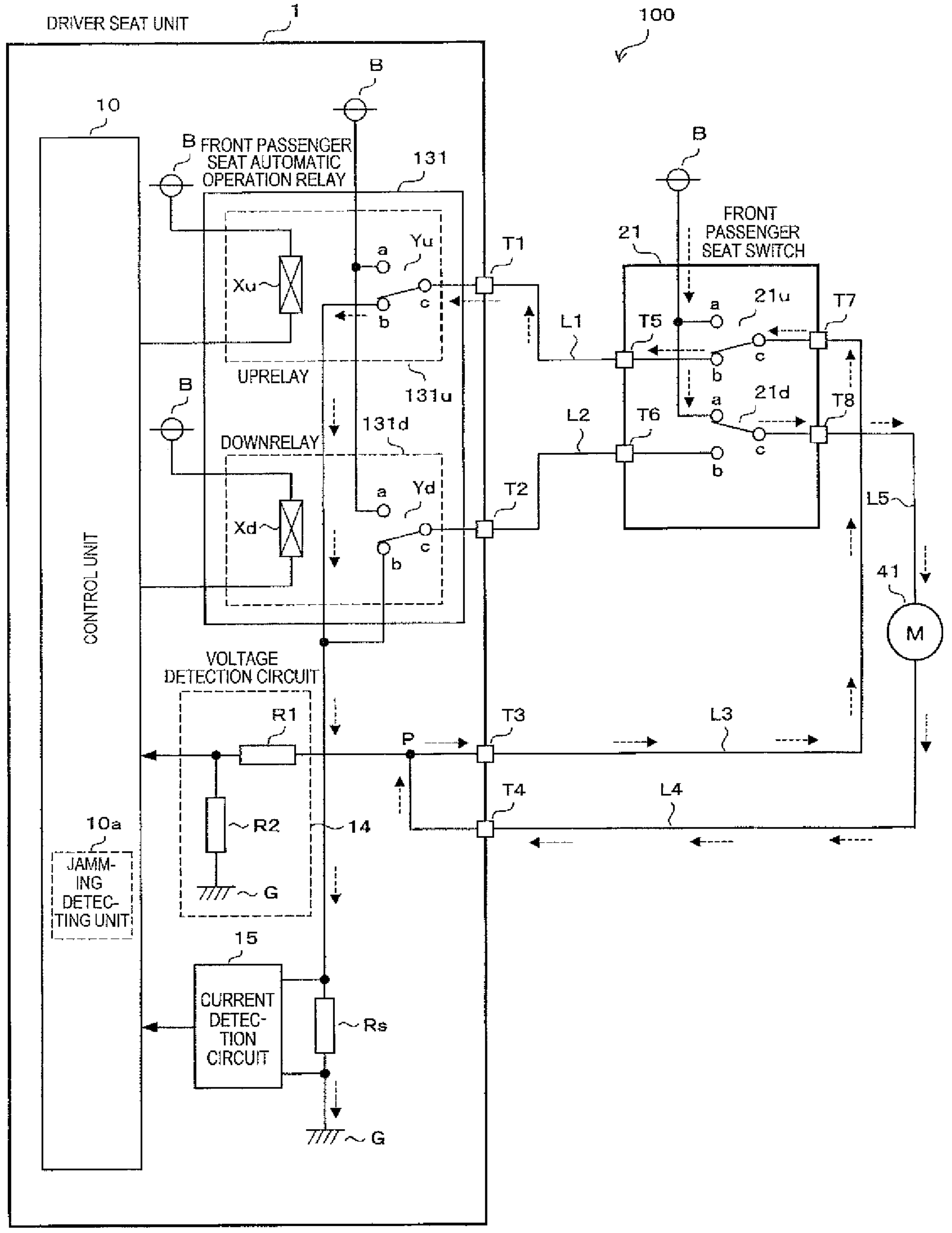
FIG. 9 is a diagram illustrating a circuit state when the front passenger seat switch is set to the down operation (the window opening operation)

FIG. 9 illustrates a current route when the front passenger seat switch 121 of the driver seat unit 1 is not operated, and the front passenger seat switch 21 of the non-driver seat switch 2 is set to the down operation. When the front passenger seat switch 21 is set to the down operation, the window opening down switch 21*d* is switched to the normally open terminal a. As illustrated by the dotted line arrow, the following current route is formed as: the power supply B→the down switch 21*d*→the terminal T8→the wiring L5→the front passenger seat motor 41→the wiring L4→the terminal T4→the terminal T3→the wiring L3→the terminal T7→the up switch 21*u*→the terminal T5→the wiring L1→the terminal T1→the contact Yu of the up relay 131*u*→the shunt resistor Rs→the ground G.

For this reason, a current flows so as to cause the front passenger seat motor 41 to rotate in the counter-clockwise direction. As a result, the front passenger seat motor 41 rotates in the counter-clockwise direction, and the window becomes opened in association with the counter-clockwise rotation. When the down operation is released before a certain time period elapses, the down switch 21*d* switches back to the normally closed terminal b, the power window apparatus 100 returns to the state illustrated in FIG. 2, and the front passenger seat motor 41 is stopped. Accordingly, the manual down operation is performed. In other words, the window can only be opened while the front passenger seat switch 21 is being set to the down operation.

Automatic Down Operation

Figure 10:
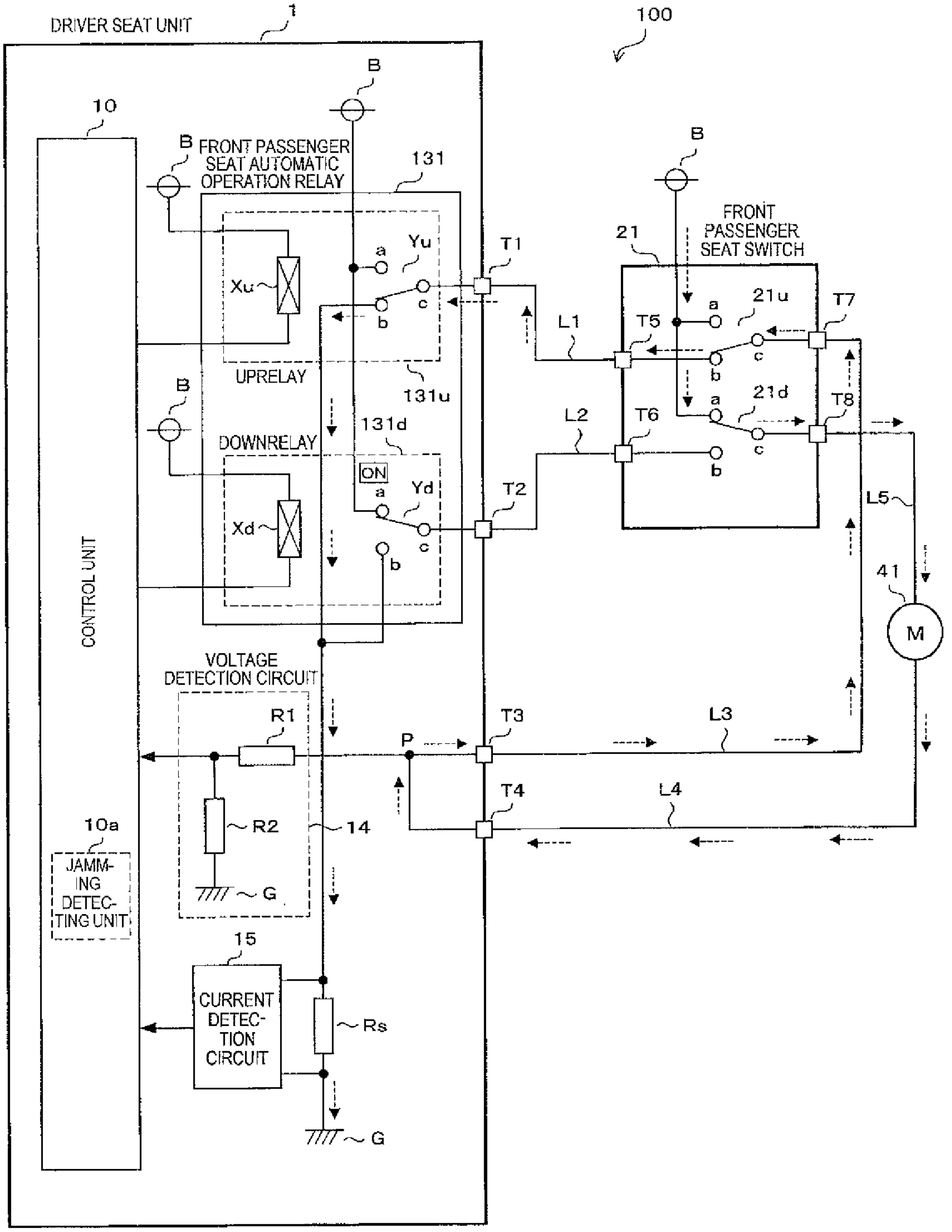

FIG. 10 illustrates a current route when the setting of the front passenger seat switch 21 to the down operation continues from the state illustrated in FIG. 9 for more than a certain time period. When the down switch 21*d* is switched to the normally open terminal a, and a current flows to the front passenger seat motor 41 via the path illustrated in FIG. 9, the voltage detection circuit 14 detects the voltage Vdown (the P point voltage) at one end of the front passenger seat motor 41. At this time, the P point voltage becomes approximately equal to a value obtained by subtracting a voltage drop Vm at the front passenger seat motor 41 from the power supply B. That is, the voltage Vdown becomes approximately equal to the value obtained by subtracting the motor voltage drop Vm from the power supply voltage B. The voltage Vdown is divided by the resistors R1 and R2 of the voltage detection circuit 14, and the divided voltage Vdown*R2/(R1+R2) is input to the control unit 10. The control unit 10 monitors a time period for which the divided voltage is continuously input thereto. Accordingly, the control unit 10 can determine whether the front passenger seat switch 21 is set to the down operation for more than a certain time period, and then is set to an extended operation. When the voltage Vdown is approximately equal to the value obtained by subtracting the motor voltage drop Vm from the power supply voltage B, the control unit 10 determines that the extended operation of the front passenger seat switch 21 is the down operation, that is, that the down switch 21*d* is switched to the normally open terminal a.

When the control unit 10 determines that the front passenger seat switch 21 is set to the extended down operation, the control unit 10 energizes the coil Xd of the down relay 131*d* of the front passenger seat automatic operation relay 131. Accordingly, the down relay 131*d* is turned on, and as illustrated in FIG. 10, the contact Yd of the down relay 131*d* is switched to the normally open terminal a. At this point, the current route illustrated in FIG. 9 (also illustrated in FIG. 10) is maintained, and the front passenger seat motor 41 continuously rotates in the counter-clockwise direction, and thus the window opening operation continues.

Figure 11:
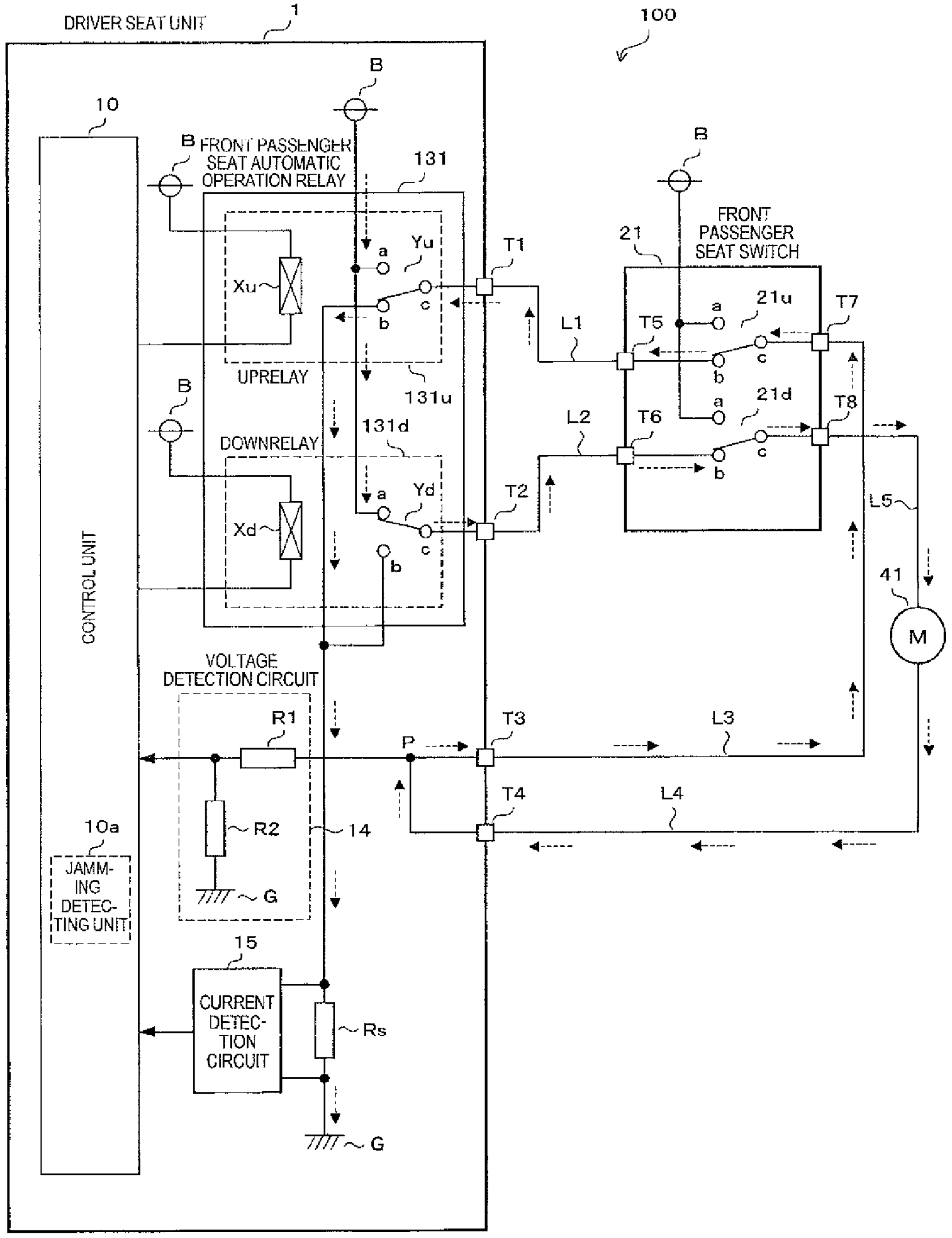
FIG. 11 is a diagram illustrating a circuit state when the down operation of the front passenger seat switch is released, and the operation transitions to an automatic opening operation.

Thereafter, when the extended operation (the down operation) of the front passenger seat switch 21 is released, as illustrated in FIG. 11, the down switch 21*d* is switched to the normally closed terminal b. As illustrated by the dotted line arrow, the following current route is formed as: the power supply B→the contact Yd of the down relay 131*d*→the terminal T2→the wiring L2→the terminal T6→the down switch 21*d*→the terminal T8→the wiring L5→the front passenger seat motor 41→the wiring L4→the terminal T4→the terminal T3→the wiring L3→the terminal T7→the up switch 21*u*→the terminal T5→the wiring L1→the terminal T1→the contact Yu of the up relay 131*u*→the shunt resistor Rs→the ground G.

For this reason, a current flows so as to cause the front passenger seat motor 41 to rotate in the counter-clockwise direction. As a result, the front passenger seat motor 41 continuously rotates in the counter-clockwise direction, and the window becomes opened in association with the counter-clockwise rotation. When the control unit 10 detects that the window reaches a fully open state, the control unit 10 stops the energization of the coil Xd of the down relay 131*d*. Accordingly, the down relay 131*d* is turned off, and the contact Yd of the down relay 131*d* is switched to the normally closed terminal b. As a result, a current does not flow to the front passenger seat motor 41, and the front passenger seat motor 41 is stopped. Similarly to the case where the fully closed window can be detected, a fully open window can be detected based on a motor current flowing through the shunt resistor Rs.

As such, when the down operation of the front passenger seat switch 21 continues for more than a certain time period, the down relay 131*d* is turned on, and the front passenger seat motor 41 is continuously energized via the contact Yd of the down relay 131*d*. Accordingly, the automatic down operation is performed. In other words, even when the down operation of the front passenger seat switch 21 is released, the front passenger seat window is automatically operated to be in the fully open state.

Figure 12:
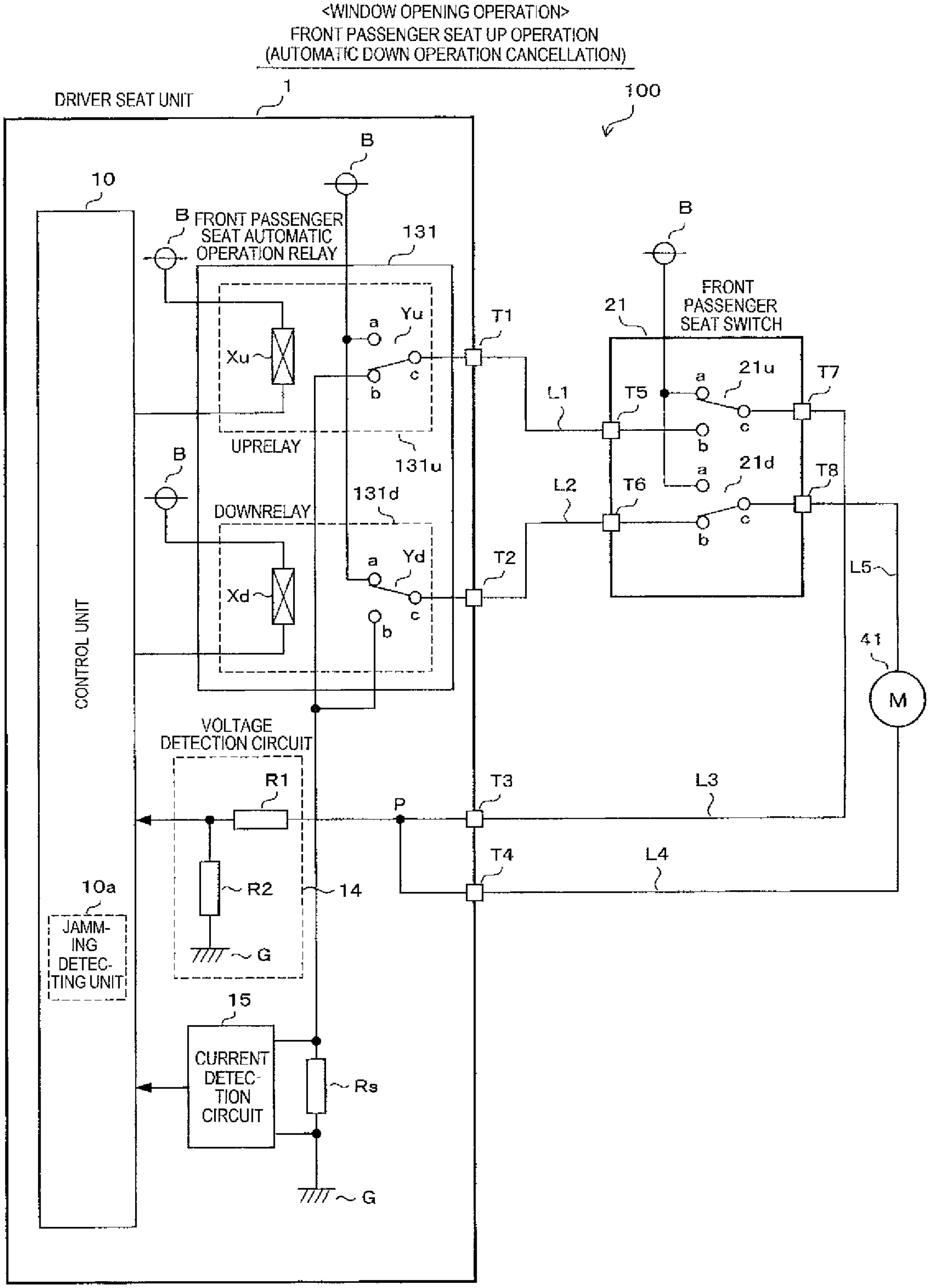
FIG. 12 is a diagram illustrating a circuit state when the front passenger seat switch is set to the up operation (the window closing operation), and the automatic opening operation is released.

When the occupant wants to cancel (release) the ongoing automatic down operation, and stop the front passenger seat motor 41, the occupant sets the front passenger seat switch 21 to the up operation. As illustrated in FIG. 12, the up operation causes the up switch 21*u* of the front passenger seat switch 21 to be switched to the normally open terminal a. One end of the front passenger seat motor 41 is connected to the power supply B via the wiring L4, the wiring L3, and the up switch 21*u*. The other end of the front passenger seat motor 41 is connected to the power supply B via the wiring L5, the down switch 21*d*, the wiring L2, and the contact Yd of the down relay 131*d*. As a result, both ends of the front passenger seat motor 41 have the same electric potential, and thus a current does not flow to the front passenger seat motor 41, and the front passenger seat motor 41 is stopped. The window opening operation is stopped.

Figure 13:
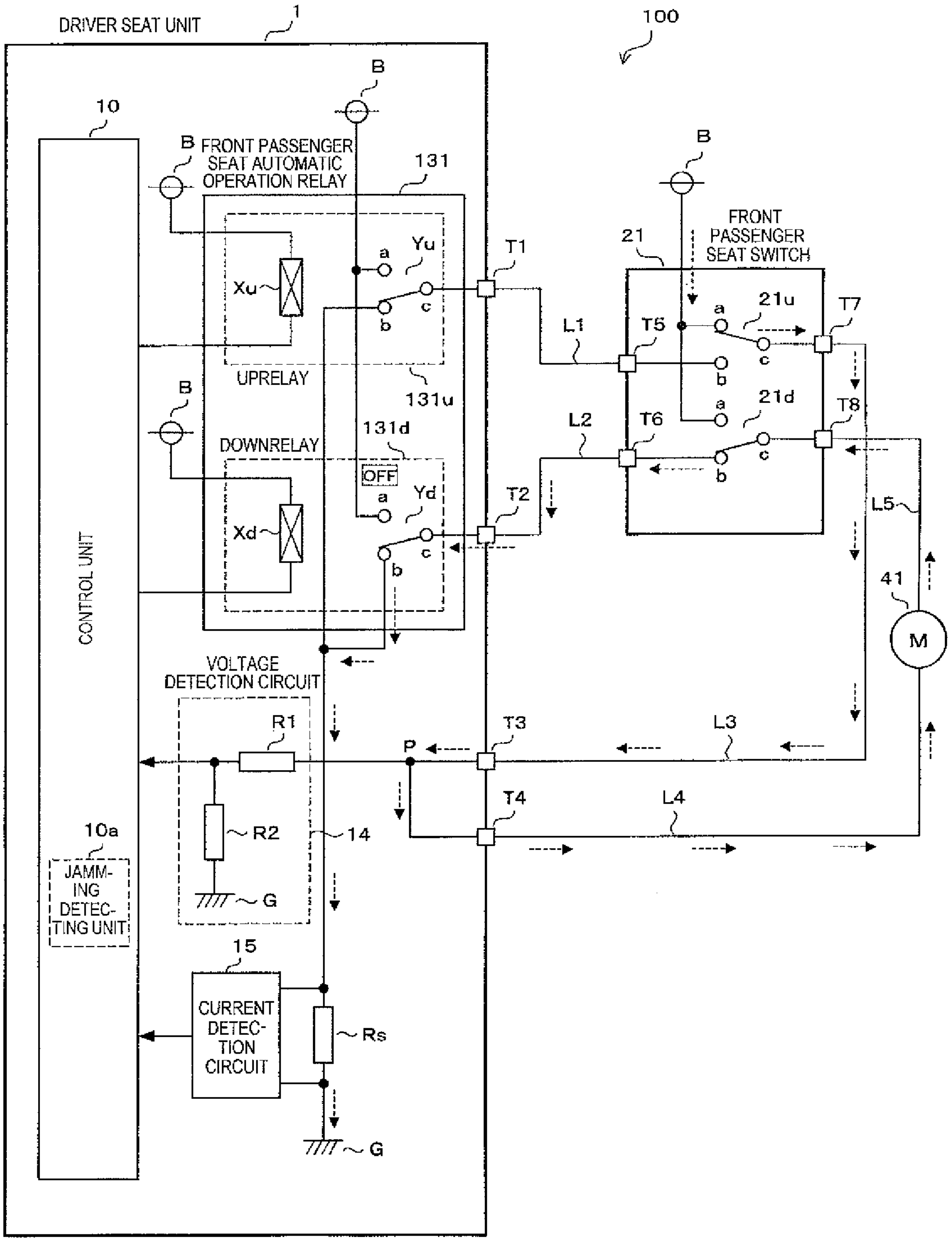
FIG. 13 is a diagram illustrating a circuit state when the down relay is turned off.

When a current does not flow to the front passenger seat motor 41, the current detection circuit 15 cannot detect a motor current, and there is no output from the current detection circuit 15 to the control unit 10. Accordingly, the control unit 10 determines that the automatic down operation is released, and stops the energization of the coil Xd of the down relay 131*d*. As a result, as illustrated in FIG. 13, the down relay 131*d* is turned off, and the contact Yd is switched to the normally closed terminal b. Accordingly, the power window apparatus 100 enters the same state as that when the front passenger seat switch 21 is set to the up operation so as to close the window (the case illustrated in FIG. 3). As a result, before the up operation of the front passenger seat switch 21 is released, a current flows so as to cause the front passenger seat motor 41 to rotate in the clockwise direction, and the window is closed.

As such, when the front passenger seat switch 21 is operated to an up position opposite to a down position in the middle of the automatic down operation, the automatic down operation is released. Accordingly, it is possible to stop the window opening operation.

FIGS. 14A to 14F show timing charts for the window opening operations described above. FIGS. 14A to 14F correspond to FIGS. 8A to 8F, respectively.

The state illustrated in FIG. 2A is shown in a range A of up to the time t1. In this state, a motor current does not flow to the front passenger seat motor 41.

Figures 14A, 14B, 14C, 14D, 14E, 14F:
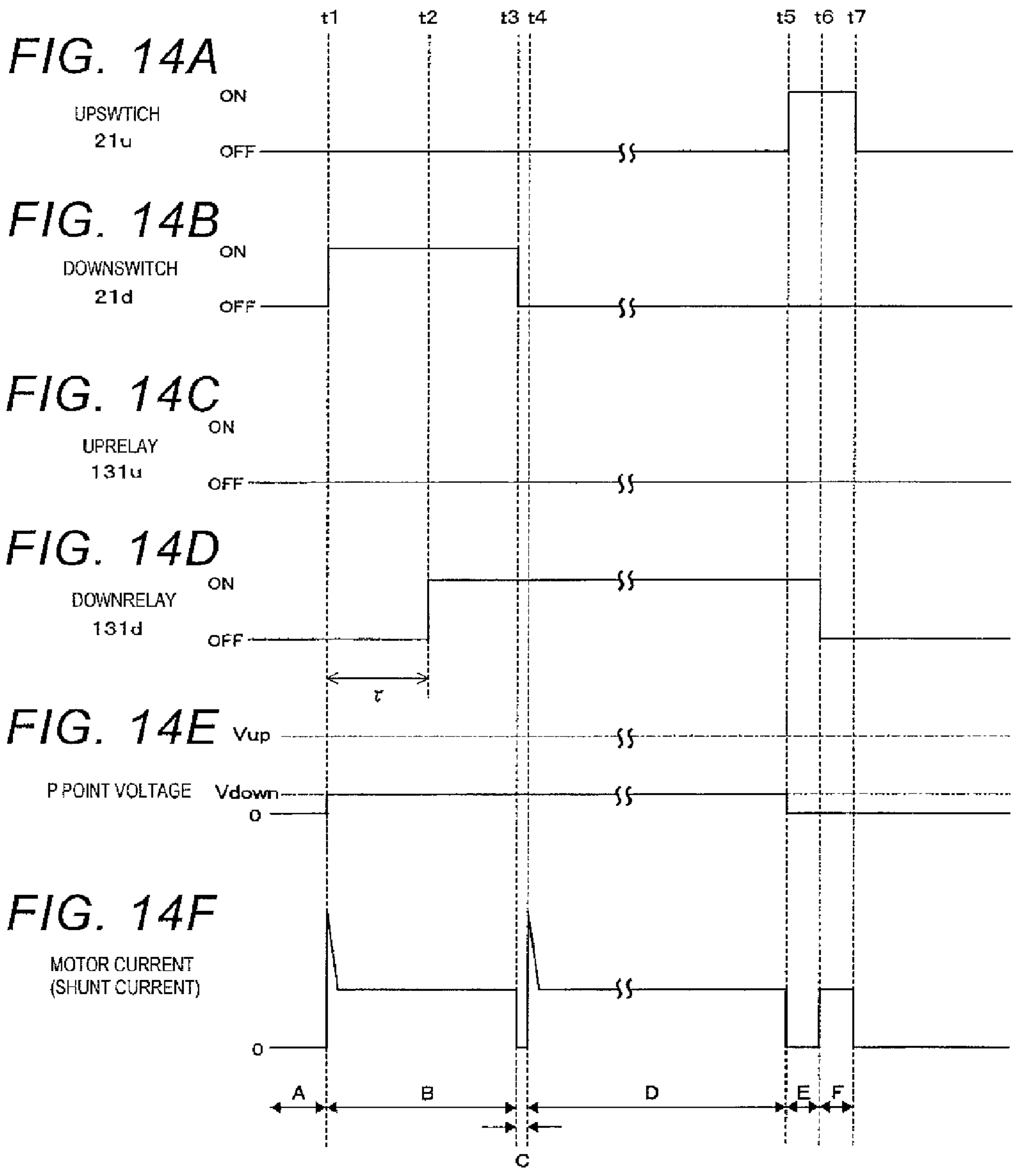
FIGS. 14A to 14F show timing charts for the operations illustrated in FIGS. 9 to 13.

The states illustrated in FIGS. 9 and 10 are shown in the range B of the time t1 to t3. At the time t1, the front passenger seat switch 21 is set to the down operation, and as illustrated in FIG. 14B, the down switch 21*d* is turned on, and is switched to the normally open terminal a. For this reason, the current route is formed as illustrated in FIG. 9, and as illustrated in FIG. 14F, a motor current flows to the front passenger seat motor 41. A steeply rising motor current at the time t1 indicates an inrush current. When a motor current flows to the front passenger seat motor 41, the P point voltage becomes the voltage Vdown as illustrated in FIG. 14E.

When the front passenger seat switch 21 is set to the down operation, and then is continuously set to the down operation even after a certain time period $\tau$ elapses, as illustrated in FIG. 14D, the down relay 131*d* is turned on at the time t2, and the contact Yd is switched to the normally open terminal a (refer to FIG. 10). Thereafter, when the down operation of the front passenger seat switch 21 is released at the time t3, as illustrated in FIG. 14B, the down switch 21*d* is turned off, and is switched to the normally closed terminal b. It takes a certain time period for the down switch 21*d* to be switched from the normally open terminal a to the normally closed terminal b. For this reason, as illustrated in FIG. 14F, a current does not flow to the front passenger seat motor 41 during the range C of the time t3 to t4. However, since the range C is a very short time period, inertia causes the front passenger seat motor 41 to continuously rotate during the range C. When the down switch 21*d* comes into contact with the normally closed terminal b at the time t4, as illustrated in FIG. 14F, a current flows again to the front passenger seat motor 41. A steeply rising motor current at the time t4 indicates an inrush current.

The state illustrated in FIG. 11 is shown in the range D of the time t4 to t5. In this state, the front passenger seat motor 41 is continuously energized via the contact Yd of the down relay 131*d*. Accordingly, even when the down operation of the front passenger seat switch 21 is released, the front passenger seat window is opened in the automatic down operation mode.

The state illustrated in FIG. 12 is shown in the range E of the time t5 to t6. When the front passenger seat switch 21 is set to the up operation at the time t5, as illustrated in FIG. 14A the up switch 21*u* is turned on, and is switched to the normally open terminal a. For this reason, both ends of the front passenger seat motor 41 have the same electric potential, and as illustrated in FIG. 14F, a current does not flow to the front passenger seat motor 41. Accordingly, as illustrated in FIG. 14E, the P point voltage becomes 0. The automatic down operation is released, and the front passenger seat motor 41 is stopped.

The state illustrated in FIG. 13 is shown in the range F of the time t6 to t7. As illustrated in FIG. 14D, the down relay 131*d* is turned off at the time t6, and the contact Yd is switched to the normally closed terminal b (refer to FIG. 13). At this time, as described above, a current flows so as to cause the front passenger seat motor 41 to rotate in the clockwise direction, and the window is closed. Thereafter, when the up operation of the front passenger seat switch 21 is released at the time t7, as illustrated in FIG. 14A, the up switch 21*u* is turned off, and is switched to the normally closed terminal b. Accordingly, a current does not flow to the front passenger seat motor 41, and the window closing operation is stopped. The circuit returns to the state illustrated in FIG. 2.

In the above descriptions, the front passenger seat switch 21 of the non-driver seat switch 2 is set to the up operation or the down operation. However, when the right rear seat switch 22 or the left rear seat switch 23 is set to the up operation or the down operation, the same operations described above are performed.

Subsequently, a method of detecting whether foreign debris is jammed in a window will be described. In the following example, an occurrence of jamming in the front passenger seat window is detected. However, an occurrence of jamming in the driver seat window or the right and left rear seat windows can be detected in the same manner.

As described above, a motor current of the front seat motor 41 flows through the shunt resistor Rs, and the current detection circuit 15 detects the motor current based on a voltage drop of the current occurring in the shunt resistor Rs. The jamming detecting unit 10*a* of the control unit 10 detects jamming based on the motor current detected by the current detection circuit 15. Hereinafter, the jamming detection method will be described in more detail.

Figure 15A:
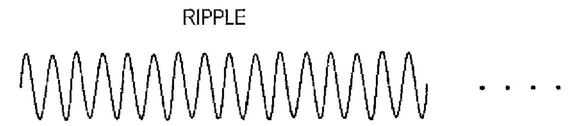
FIGS. 15A and 15B illustrate ripple waveforms and converted pulse waveforms of a current of a motor in a normal state.
Figure 15B:
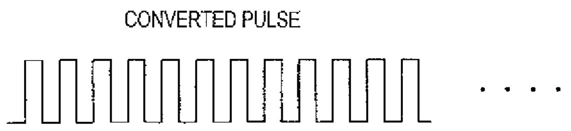

Typically, a motor current contains a ripple. When there is no occurrence of jamming, a ripple waveform becomes a stable waveform as illustrated in FIG. 15A. The control unit 10 converts the ripple into a series of pulses as illustrated in FIG. 15B.

Figure 16A:
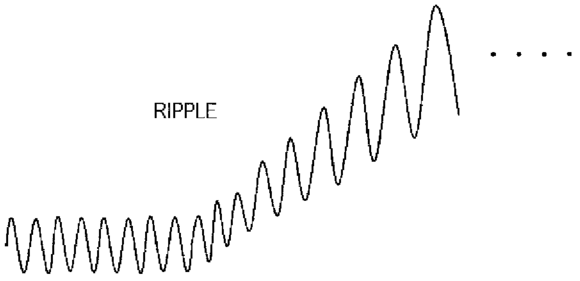
FIGS. 16A and 16B illustrate ripple waveforms and converted pulse waveforms of a current of a motor when jamming occurs.
Figure 16B:
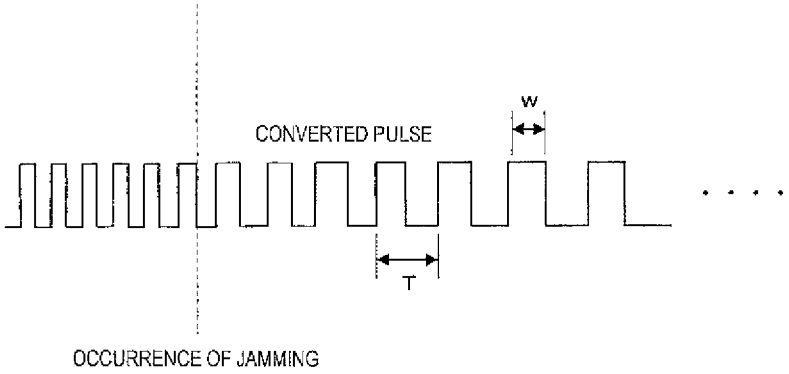

In contrast, when there is an occurrence of jamming, as illustrated in FIG. 16A, a ripple of a motor current becomes an unstable waveform in which a current level increases, and the period extends. The ripple is converted into a series of pulses as illustrated in FIG. 16B. When the jamming detecting unit 10*a* monitors a change in period T of the series of pulses, and the period T is greater than or equal to a certain value, the jamming detecting unit 10*a* determines that there is an occurrence of jamming. Alternatively, when the jamming detecting unit 10*a* monitors a pulse width w instead of the period T, and the pulse width W is greater than or equal to a certain value, the jamming detecting unit 10*a* may determine that there is an occurrence of jamming. As such, it is possible to detect an occurrence of jamming based on the ripple of the motor current.

Figure 17A:
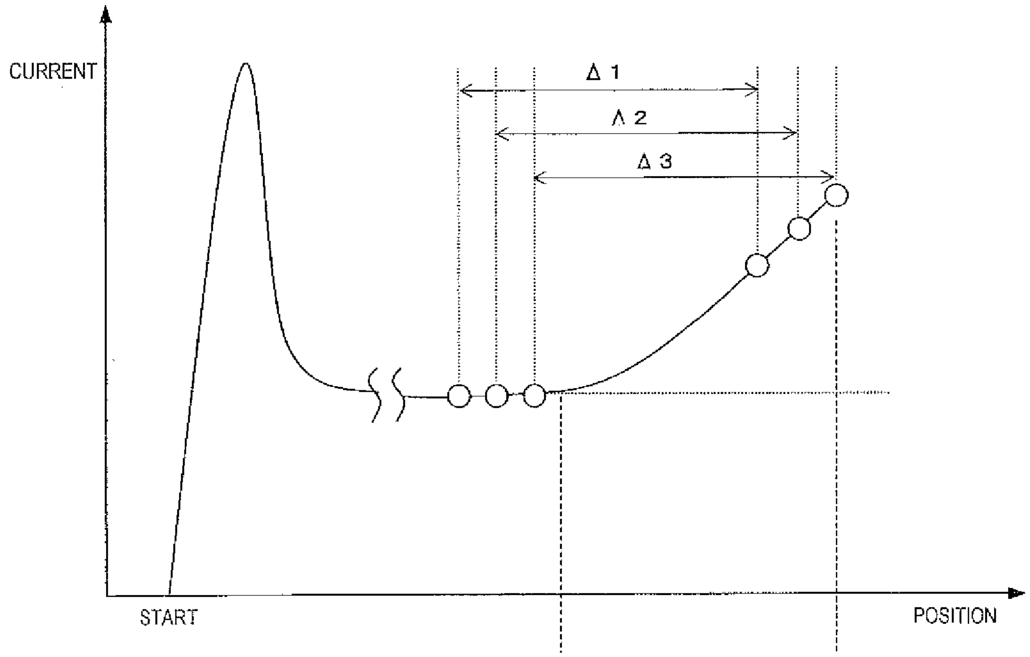
FIGS. 17A and 17B illustrate graphs describing another example of a jamming detection method.
Figure 17B:
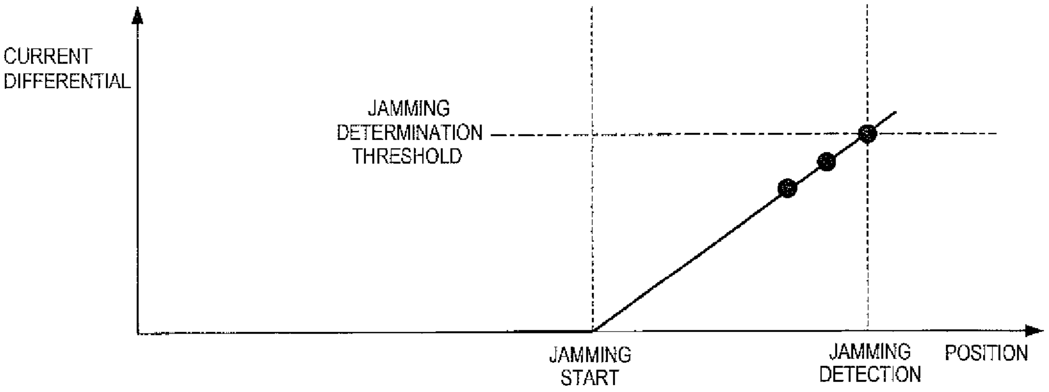

A change in current value may be monitored by another jamming detection method. FIG. 17A illustrates a change in motor current. An inrush current flows at the start of a motor, and thus a motor current increases sharply, and thereafter, settles into a stable state. However, when there is an occurrence of jamming, the motor is locked, and the motor current increases. Each differential Δ1, Δ2, Δ3 . . . between a present current value and a past current value is calculated, and the current differential is compared with a jamming determination threshold value as illustrated in FIG. 17B. When the current differential exceeds the threshold value, it is determined that there is an occurrence of jamming.

According to the embodiment, the non-driver seat switch 2 is a manual switch that can only be used to open and close a window while the non-driver seat switch 2 is being operated. When the non-driver seat switch 2 is operated for more than a certain time period, and then is set to an extended operation (the up operation or the down operation), the up relay 131*u* or the down relay 131*d* is turned on, and the operation of the non-driver seat switch 2 transitions to an automatic operation, and the non-driver seat motor 4 is energized via the contact Yu of the corresponding relay and the non-driver seat switch 2, or via the contact Yd of the corresponding relay and the non-driver seat switch 2. As a result, it is possible to perform the automatic up operation or the automatic down operation by means of the manual switch, and thus it is possible to simplify the configuration of the non-driver seat switch 2, and to open and close the non-driver seat window in the automatic operation mode by means of the non-driver seat switch 2.

According to the embodiment, when the occupant wants to cancel the on-going automatic up operation, the occupant sets the non-driver seat switch 2 to the down operation. Accordingly, a current does not flow to the non-driver seat motor 4, and the window closing operation can be stopped. In contrast, when the occupant wants to cancel the on-going automatic down operation, the occupant sets the non-driver seat switch 2 to the up operation. Accordingly, a current does not flow to the non-driver seat motor 4, and the window opening operation can be stopped.

According to the embodiment, the control unit determines whether an extended operation of the non-driver seat switch 2 is the up operation or the down operation based on the voltage value detected by the voltage detection circuit 14. At this time, since a difference in P point voltage level between the up and down operations is apparent, it is possible to easily determine which operation is performed.

According to the embodiment, when each of the switches 21 to 23 of the non-driver seat switch 2 is not replaced with an automatic operation switch, and when the driver seat unit 1 and the wirings are changed, it is possible to open and close all of the seat windows including the non-driver seat windows.

The invention can adopt various embodiments other than the embodiment described above. For example, in the embodiment, the non-driver seat switch 2 is configured to include the three non-driver seat switches such as the front passenger seat switch 21, the right rear seat switch 22, and the left rear seat switch 23. However, it is possible to determine the number of non-driver seat switches 2 based on the number of seats.

In the embodiment, the non-driver seat automatic operation relay 13 is used as a switching circuit that switches an opening and closing operation of the non-driver seat window from the manual operation to the automatic operation. However, instead of the relay, a switching element such as a transistor or FET may be used as the switching circuit.

In the embodiment, when it is detected that the non-driver seat switch 2 is set to the up operation or the down operation for more than a predetermined time period, the operation of the non-driver seat switch 2 transitions to an automatic operation. However, when it is determined that the non-driver seat switch 2 is set to the up operation or the down operation for multiple consecutive times (for example, two times) within a predetermined time period, the operation of the non-driver seat switch 2 may transition to an automatic operation.

In the embodiment, a fully closed window or a fully open window is detected based on a motor current flowing through the shunt resistor Rs. However, other methods may be adopted. For example, the number of rotations of a motor is calculated based on the series of pulses illustrated in FIG. 15B, and a fully closed window or a fully open window may be detected based on the calculated result.

In the embodiment, the control unit 10 turns off the up relay 131*u* or the down relay 131*d* based on the fact that the current detection circuit 15 does not detect a motor current when an automatic operation is canceled. However, other methods may be adopted. For example, when a motor is stopped, a motor voltage level decreases. Accordingly, the control unit 10 may turn off the up relay 131*u* or the down relay 131*d* based on the detected result from the voltage detection circuit 14.

In the embodiment, the control unit determines that the non-driver seat switch 2 is set to an extended operation based on the voltage detected by the voltage detection circuit 14. However, the control unit may determine that the non-driver seat switch 2 is set to an extended operation based on the current detected by the current detection circuit 15. Similarly, in the embodiment, the control unit determines whether an extended operation of the non-driver seat switch 2 is the up operation or the down operation based on the voltage value detected by the voltage detection circuit 14. However, the control unit can determine whether an extended operation of the non-driver seat switch 2 is the up operation or the down operation based on the current value detected by the current detection circuit 15.

In the embodiment, a voltage at one end of the non-driver seat motor 4 is detected by the voltage detection circuit 14. However, a voltage at the other end of the non-driver seat motor 4 may be detected by the voltage detection circuit 14. Furthermore, in the embodiment, both of the voltage detection circuit 14 and the current detection circuit 15 are provided. However, only one of the voltage detection circuit 14 and the current detection circuit 15 may be provided.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited by the attached claims.

What is claimed is:

1. A vehicle power window apparatus comprising:

a driver seat unit that is provided on a driver seat in a vehicle; and a first non-driver seat switch that is provided on a non-driver seat, that is electrically connected to the driver seat unit, and that is used to open and close a non-driver seat window, wherein the driver seat unit comprises:

a driver seat switch that is used to open and close a driver seat window;

a second non-driver seat switch that is used to open and close the non-driver seat window; and a control unit that controls a driver seat motor that opens and closes the driver seat window based on an operation of the driver seat switch, and a non-driver seat motor that opens and closes the non-driver seat window based on an operation of the second non-driver seat switch, wherein the driver seat unit comprises a switching circuit that is operated based on a predetermined operation of the first non-driver seat switch, wherein the first non-driver seat switch is a manual switch used to open and close the non-driver seat window in a manual operation mode, and the first non-driver seat switch comprises:

a first switch that connects a first end of the non-driver seat motor to a power supply or the switching circuit; and a second switch that connects a second end of the non-driver seat motor to the power supply or the switching circuit, wherein the driver seat unit comprises a detecting unit that comprises at least one of a voltage detection circuit and a current detection circuit, wherein the voltage detection circuit that detects a voltage at one of the first end and the second end of the non-driver seat motor, and the current detection circuit that detects a current flowing through the non-driver seat motor, wherein when an extended operation of the first non-driver seat switch set by operating the first non-driver seat switch for a certain time period or more is detected based on the voltage or the current detected by the detecting unit in a state where the second non-driver seat switch is not operated, the control unit drives the switching circuit, and wherein after the extended operation of the first non-driver seat switch is released, the control unit fully opens or closes the non-driver seat window in an automatic operation mode by energizing the non-driver seat motor via the switching circuit and the first non-driver seat switch by the power supply.

2. The vehicle power window apparatus according to claim 1, wherein after the extended operation of the first non-driver seat switch is released, when the first non-driver seat switch is operated to a window opening position while the non-driver seat window is being closed in an automatic closing operation mode, the control unit releases the automatic closing operation and stops the non-driver seat motor, and wherein after the extended operation of the first non-driver seat switch is released, when the first non-driver seat switch is operated to a window closing position while the non-driver seat window is being opened in an automatic opening operation mode, the control unit releases the automatic opening operation and stops the non-driver seat motor.

3. The vehicle power window apparatus according to claim 2, wherein the switching circuit comprises a first window closing relay and a second window opening relay, wherein when the first non-driver seat switch is operated to the window closing position, the first switch is switched to a power supply side, wherein when the first non-driver seat switch is operated to the window opening position, the second switch is switched to the power supply side, wherein in a state where the first switch is switched to the power supply side, when the first non-driver seat switch is set to the extended operation, the first relay is switched to the power supply side, and after the extended operation of the first non-driver seat switch is released, a current route is formed from the power supply to a ground via the first relay, the first switch, the non-driver seat motor, the second switch, and the second relay, and wherein in a state where the second switch is switched to the power supply side, when the first non-driver seat switch is set to the extended operation, the second relay is switched to the power supply side, and after the extended operation of the first non-driver seat switch is released, a current route is formed from the power supply to the ground via the second relay, the second switch, the non-driver seat motor, the first switch, and the first relay.

4. The vehicle power window apparatus according to claim 3, wherein the control unit determines which one of the first and second switches is switched to the power supply side, based on the voltage detected by the voltage detection circuit when the first switch is switched to the power supply side, and based on the voltage detected by the voltage detection circuit when the second switch is switched to the power supply side, and wherein when the control unit determines that the first switch is switched to the power supply side, the control unit switches the first relay to the power supply, and when the control unit determines that the second switch is switched to the power supply side, the control unit switches the second relay to the power supply side.

5. The vehicle power window apparatus according to claim 1, wherein the switching circuit comprises a first window closing relay and a second window opening relay, wherein when the first non-driver seat switch is operated to the window closing position, the first switch is switched to a power supply side, wherein when the first non-driver seat switch is operated to the window opening position, the second switch is switched to the power supply side, wherein in a state where the first switch is switched to the power supply side, when the first non-driver seat switch is set to the extended operation, the first relay is switched to the power supply side, and after the extended operation of the first non-driver seat switch is released, a current route is formed from the power supply to a ground via the first relay, the first switch, the non-driver seat motor, the second switch, and the second relay, and wherein in a state where the second switch is switched to the power supply side, when the first non-driver seat switch is set to the extended operation, the second relay is switched to the power supply side, and after the extended operation of the first non-driver seat switch is released, a current route is formed from the power supply to the ground via the second relay, the second switch, the non-driver seat motor, the first switch, and the first relay.

6. The vehicle power window apparatus according to claim 5, wherein the control unit determines which one of the first and second switches is switched to the power supply side, based on the voltage detected by the voltage detection circuit when the first switch is switched to the power supply side, and based on the voltage detected by the voltage detection circuit when the second switch is switched to the power supply side, and wherein when the control unit determines that the first switch is switched to the power supply side, the control unit switches the first relay to the power supply, and when the control unit determines that the second switch is switched to the power supply side, the control unit switches the second relay to the power supply side.

7. The vehicle power window apparatus according to claim 1, wherein the control unit detects whether the first non-driver seat switch is operated for multiple consecutive times within a predetermined time period, instead of detecting whether the first non-driver seat switch is set to the extended operation by operating the first non-driver seat switch for the predetermined time period or more.

8. The vehicle power window apparatus according to claim 2, wherein the control unit detects whether the first non-driver seat switch is operated for multiple consecutive times within a predetermined time period, instead of detecting whether the first non-driver seat switch is set to the extended operation by operating the first non-driver seat switch for the predetermined time period or more.

9. The vehicle power window apparatus according to claim 3, wherein the control unit detects whether the first non-driver seat switch is operated for multiple consecutive times within a predetermined time period, instead of detecting whether the first non-driver seat switch is set to the extended operation by operating the first non-driver seat switch for the predetermined time period or more.

10. The vehicle power window apparatus according to claim 4, wherein the control unit detects whether the first non-driver seat switch is operated for multiple consecutive times within a predetermined time period, instead of detecting whether the first non-driver seat switch is set to the extended operation by operating the first non-driver seat switch for the predetermined time period or more.

11. The vehicle power window apparatus according to claim 5, wherein the control unit detects whether the first non-driver seat switch is operated for multiple consecutive times within a predetermined time period, instead of detecting whether the first non-driver seat switch is set to the extended operation by operating the first non-driver seat switch for the predetermined time period or more.

12. The vehicle power window apparatus according to claim 6, wherein the control unit detects whether the first non-driver seat switch is operated for multiple consecutive times within a predetermined time period, instead of detecting whether the first non-driver seat switch is set to the extended operation by operating the first non-driver seat switch for the predetermined time period or more.

* * * * *